US00RE46500E

(19) United States
(12) Reissued Patent
Lu et al.

(10) Patent Number: US RE46,500 E
(45) Date of Reissued Patent: Aug. 1, 2017

(54) MOVING PICTURE CODING METHOD AND MOVING PICTURE DECODING METHOD

(71) Applicant: DOLBY INTERNATIONAL AB, Amsterdam Zuidoost (NL)

(72) Inventors: Jiuhuai Lu, Palos Verdes, CA (US); Tao Chen, Diamond Bar, CA (US); Yoshiichiro Kashiwagi, Arcadia, CA (US); Shinya Kadono Kadono, Nishinomiya (JP); Chong Soon Lim, Singapore (SG)

(73) Assignee: Dolby International AB, Amsterdam (NL)

(21) Appl. No.: 15/048,567

(22) Filed: Feb. 19, 2016

Related U.S. Patent Documents

Reissue of:
(64) Patent No.: 8,396,116
Issued: Mar. 12, 2013
Appl. No.: 13/488,242
Filed: Jun. 4, 2012

U.S. Applications:
(62) Division of application No. 13/039,079, filed on Mar. 2, 2011, now Pat. No. 8,218,623, which is a division of application No. 10/569,872, filed as application No. PCT/US2005/002458 on Jan. 26, 2005, now Pat. No. 7,933,327.

(60) Provisional application No. 60/561,351, filed on Apr. 12, 2004, provisional application No. 60/552,907, filed on Mar. 12, 2004,
(Continued)

(51) Int. Cl.
*H04N 19/159* (2014.01)

(52) U.S. Cl.
CPC ..... *H04N 19/159* (2014.11)

(58) Field of Classification Search
CPC ..... H04N 19/159
USPC ..... 375/240.01
See application file for complete search history.

(56) References Cited

U.S. PATENT DOCUMENTS 5,034,965 A 7/1991 Kato
5,392,037 A 2/1995 Kato
(Continued)

FOREIGN PATENT DOCUMENTS

EP 02-216917 8/1990
EP 0 593 159 4/1994
(Continued)

OTHER PUBLICATIONS

Draft ITU—T Recommendation H.264 (aka "H.26L"), ITU—Telecommunications Standardization Sector; Study Group 16, Question 6; Video Coding Experts Group (VCEG); 16th Meeting: Fairfax, VA USA, May 6-10, 2002, pp. 2-142.
(Continued)

*Primary Examiner* — Fred Ferris, III

(57) ABSTRACT

A moving picture coding apparatus 1 includes: a quantization matrix holding unit (112) that holds a quantization matrix (WM) which has already been transmitted in a parameter set and a matrix ID for identifying the quantization matrix (WM), which are associated with each other; and a variable length coding unit (111) that obtains the matrix ID corresponding to the quantization matrix (WM) used for quantization from the quantization matrix holding unit (112) and places the matrix ID in a coded stream Str.

2 Claims, 17 Drawing Sheets

Related U.S. Application Data provisional application No. 60/540,499, filed on Jan. 30, 2004.

(56) References Cited

U.S. PATENT DOCUMENTS

| | | | | |
|---|---|---|---|---|
| 5,613,015 | A | 3/1997 | Suzuki et al. | |
| 5,879,948 | A | 3/1999 | Van Pelt et al. | |
| 5,881,177 | A | 3/1999 | Kim | |
| 5,937,098 | A | 8/1999 | Abe | |
| 6,005,982 | A | 12/1999 | Abe | |
| 6,067,118 | A * | 5/2000 | Chen et al. | H04N 19/60 375/240.03 |
| 6,126,910 | A | 10/2000 | Wilhelm et al. | |
| 6,403,526 | B1 | 6/2002 | Lussier et al. | |
| 6,445,739 | B1 | 9/2002 | Shen et al. | |
| 6,804,302 | B1 | 10/2004 | Yamada et al. | |
| 6,818,043 | B1 | 11/2004 | Chang et al. | |
| 6,928,113 | B1 | 8/2005 | Mihara | |
| 6,999,511 | B1 | 2/2006 | Boice et al. | |
| 7,149,811 | B2 * | 12/2006 | Wise | G06F 9/3867 375/240.25 |
| 7,295,609 | B2 * | 11/2007 | Sato | H04N 7/50 375/240.03 |
| 7,620,103 | B2 * | 11/2009 | Cote | H04B 1/66 375/240.03 |
| 7,929,624 | B2 * | 4/2011 | Lindoff | H04J 11/0069 375/260 |
| 2002/0114388 | A1 | 8/2002 | Ueda et al. | |
| 2003/0147463 | A1 | 8/2003 | Sato et al. | |
| 2007/0286501 | A1 | 12/2007 | Sato et al. | |
| 2009/0010334 | A1 | 1/2009 | Ueda et al. | |
| 2010/0061450 | A1 | 3/2010 | Sato et al. | |
| 2010/0061644 | A1 | 3/2010 | Sato et al. | |
| 2015/0334396 | A1 * | 11/2015 | Lim | H04N 19/196 375/240.03 |

FOREIGN PATENT DOCUMENTS

| | | |
|---|---|---|
| EP | 0593159 | 4/1994 |
| JP | 02-216917 | 8/1990 |
| JP | 04-343576 | 11/1992 |
| JP | 05-235778 | 9/1993 |
| JP | 07-075102 | 3/1994 |
| JP | 06-284412 | 10/1994 |
| JP | 07-075102 | 3/1995 |
| JP | 10-276097 | 10/1998 |
| JP | 11-088880 | 3/1999 |
| JP | 2001-258029 | 9/2001 |
| JP | 2001-359107 | 12/2001 |
| JP | 2003-289542 | 10/2003 |

OTHER PUBLICATIONS

Pan, "Adaptive Image Compression Using Local Pattern Information," Pattern Recognition Letters, Elsevier Science, Amsterdam, NL, vol. 23, No. 14, Dec. 1, 2002, pp. 1837-1847.

Lu, Jiuhuai et al. "Proposal of Quantization Weighting for H.264/MPEG-4 AVC Professional Profiles" ITU Study Group 16—Video Coding Experts Group—ISO/IEC MPEG & ITU-T VCEG (ISO/IEC JTC1/SC29/WG11 and ITU-T SG16 Q6), No. JVT-K029r, Mar. 19, 2004, 10 pages.

European Patent Application No. 05712072.7 European Seacrch Report dated Oct. 26, 2010, 4 pages.

Suzuki, Teruhiko et al., "Quantization Tools for High Quality Video", ITU Study Group16—Video Coding Experts Group—ISO/IEC MPEG & ITU-T VCEG (ISO/IEC JTC1/SC29/WG11 and ITU-T SG16 Q6), No. JVT-B067, Feb. 1, 2002, 10 pages.

Suzuki, Teruhiko et al., "New Quantization Tools", ITU Study Group16—Video Coding Experts Group—ISO/IEC MPEG & ITU-T VCEG (ISO/IEC JTC1/SC29/WG11 and ITU-T SG16 Q6), No. M7737, Dec. 3, 2001, 11 pages.

Wiegand, Thomas et al. "Overview of the H.264/AVC Video Coding Standard", IEEE Transactions on Circuits and Systems for Video Technology, IEEE Service Center, Piscataway, NJ, USA, vol. 13, No. 7, Jul. 1, 2003, pp. 560-576.

* cited by examiner

FIG. 2

Low frequency

Horizontal high frequency

| | | | | | | | |
|---|---|---|---|---|---|---|---|
| 8 | 16 | 19 | 22 | 26 | 27 | 29 | 34 |
| 16 | 16 | 22 | 24 | 27 | 29 | 34 | 37 |
| 19 | 22 | 26 | 27 | 29 | 34 | 34 | 38 |
| 22 | 22 | 24 | 27 | 29 | 34 | 37 | 40 |
| 22 | 26 | 27 | 29 | 32 | 35 | 40 | 48 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

Vertical high frequency

FIG. 5

| | seq_parameter_set_rbsp( ) { | C | Descriptor |
|---|---|---|---|
| | profile_idc | 0 | u(8) |
| | constraint_set0_flag | 0 | u(1) |
| | constraint_set1_flag | 0 | u(1) |
| | constraint_set2_flag | 0 | u(1) |
| | constraint_set3_flag | 0 | u(1) |
| | reserved_zero_4bits /* equal to 0 */ | 0 | u(3) |
| | level_idc | 0 | u(8) |
| | seq_parameter_set_id | 0 | ue(v) |
| | if( ( profile_idc % 11 ) != 0 ) { | | |
| | chroma_format_idc | 0 | u(2) |
| | bit_depth_luma_minus8 | 0 | ue(v) |
| | bit_depth_chroma_minus8 | 0 | ue(v) |
| | lossless_qp0_flag | 0 | u(1) |
| | } | | |
| | log2_max_frame_num_minus4 | 0 | ue(v) |
| 501 | quantization_weighting_matrix_defined | 0 | u(1) |
| | if (quantization_weighting_matrix_defined) { | | |
| 502 | load_quantization_matrices 8x8( ) | | |
| | load_quantization_matrices 4x4( ) | | |
| | } | | |
| | ... | | |

FIG. 6

| pic_parameter_set_rbsp( ) { | C | Descriptor |
|---|---|---|
| ... | | |
| pic_init_qp_minus26 /* relative to 26 */ | 1 | se(v) |
| pic_init_qs_minus26 /* relative to 26 */ | 1 | se(v) |
| chroma_qp_index_offset | 1 | se(v) |
| Quantization_weighting_matrix_redefined | 1 | u(1) |
| If (quantization_weighting_matrix_redefined) { | | |
| if (transform_8x8_mode_flag) | | |
| load_quantization_matrices_8x8() | | |
| Load_quantization_matrices_4x4() | | |
| } | | |
| ... | | |

601

602

FIG. 7

| Load_quantization_matrices_8x8 () { | C | Descriptor |
|---|---|---|
| luma_intra_8x8_qm_defined | 0 | u(1) |
| if (luma_intra_8x8_qm_loaded) { | | |
| delta_luma_intra_8x8_qm[0] | 0 | se(v) |
| luma_intra_8x8_qm[i] = | | |
| (delta_luma_intra_8x8_qm[i]+8+256)%256 | | |
| for (i=1; (i <64 && abs(delta_luma_intra_8x8_qm[i])<129 && | | |
| ((delta_luma_intra_8x8_qm[i]+ luma_intra_8x8_qm | | |
| (i-1)+256)%256!=0); i ++) { | | |
| delta_luma_intra_8x8_qm [i] | 0 | se(v) |
| luma_intra_8x8_qm[i]= (delta_luma_intra_8x8_qm[i]+ | | |
| luma_intra_8x8_qm (i-1)+256)%256 | | |
| ⋮ | | |
| chroma_intra_8x8_qm_defined | 0 | u(2) |
| if (chroma_intra_8x8_qm_defined) { | | |
| delta_chroma_intra_8x8_qm1 [0] | 0 | se(v) |
| chroma_intra_8x8_qm1[i] = | | |
| (delta_chroma_intra_8x8_qm1[i]+8+256)%256 | | |
| ⋮ | | |
| if (chroma_intra_8x8_qm_defined==2) { | | |
| delta_chroma_intra_8x8_qm2 [0] | 0 | se(v) |
| chroma_intra_8x8_qm2[i] = | | |
| (delta_chroma_intra_8x8_qm2[i]+8+256)%256 | | |
| ⋮ | | |

MOVING PICTURE CODING METHOD AND MOVING PICTURE DECODING METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This is *a reissue application of U.S. Ser. No. 13/488,242, filed Jun. 4, 2012, now U.S. Pat. No. 8,396,116, which is* a divisional application of U.S. Ser. No. 13/039,079, filed on Mar. 2, 2011, *now U.S. Pat. No. 8,218,623,* which is a divisional application of U.S. Ser. No. 10/569,872 filed on Feb. 28, 2006, now U.S. Pat. No. 7,933,327, from International Application No. PCT/2005/002458 which claims priority from U.S. Provisional Application 60/540,499 filed Jan. 30, 2004, U.S. Provisional Application 60/552,907 filed Mar. 12, 2004, and U.S. Provisional Application 60/561,351 filed Apr. 12, 2004.

TECHNICAL FIELD

The present invention relates to a moving picture coding method for coding moving pictures and generating streams and a moving picture decoding method for decoding such coded streams, as well as the streams.

BACKGROUND ART

In the age of multimedia which integrally handles audio, video and other pixel values, existing information media, i.e., newspaper, magazine, television, radio, telephone and other means through which information is conveyed to people, have recently come to be included in the scope of multimedia. Generally, multimedia refers to something that is represented by associating not only characters, but also graphics, audio, and especially pictures and the like together. However, in order to include the aforementioned existing information media into the scope of multimedia, it appears as a prerequisite to represent such information in digital form.

However, when calculating the amount of information contained in each of the aforementioned information media as the amount of digital information, while the amount of information per character is 1 to 2 bytes in the case of characters, the amount of information to be required is 64 Kbits per second in the case of audio (telephone quality), and 100 Mbits per second in the case of moving pictures (current television reception quality). Therefore, it is not realistic for the aforementioned information media to handle such an enormous amount of information as it is in digital form. For example, although video phones are already in the actual use by using Integrated Services Digital Network (ISDN) which offers a transmission speed of 64 Kbits/s to 1.5 Mbits/s, it is not practical to transmit video of televisions and cameras directly through ISDN.

Against this backdrop, information compression techniques have become required, and moving picture compression techniques compliant with H.261 and H.263 standards recommended by ITU-T (International Telecommunication Union-Telecommunication Standardization Sector) are employed for video phones, for example. Moreover, according to information compression techniques compliant with the MPEG-1 standard, it is possible to store picture information into an ordinary music CD (compact disc) together with sound information.

Here, MPEG (Moving Picture Experts Group) is an international standard on compression of moving picture signals standardized by ISO/IEC (International Organization for Standardization, International Electrotechnical Commission), and MPEG-1 is a standard for compressing television signal information approximately into one hundredth so that moving picture signals can be transmitted at a rate of 1.5 Mbit/s. Furthermore, since a transmission speed achieved by the MPEG-1 standard is a middle-quality speed of about 1.5 Mbit/s, MPEG-2, which was standardized with a view to satisfying requirements for further improved picture quality, allows data transmission equivalent in quality to television broadcasting through which moving picture signals are transmitted at a rate of 2 to 15 Mbit/s. Moreover, MPEG-4 was standardized by the working group (ISO/IEC JTC1/SC29/WG11) which promoted the standardization of MPEG-1 and MPEG-2. MPEG-4, which provides a higher compression ratio than that of MPEG-1 and MPEG-2 and which enables an object-based coding/decoding/operation, is capable of providing a new functionality required in this age of multimedia. At the beginning stage of standardization, MPEG-4 aimed at providing a low bit rate coding method, but it has been extended as a standard supporting more general coding that handles interlaced images as well as high bit rate coding. Currently, an effort has been made jointly by ISO/IEC and ITU-T for standardizing MPEG-4 AVC and ITU-T H.264 as picture coding methods of the next generation that offer a higher compression ratio. As of August 2002, a committee draft (CD) is issued for a picture coding method of the next generation.

In general, in coding of a moving picture, the amount of information is compressed by reducing redundancies in temporal and spatial directions. Therefore, in inter picture prediction coding aiming at reducing temporal redundancies, motion estimation and generation of a predicative image are carried out on a block-by-block basis with reference to forward or backward picture(s), and coding is then performed on the difference value between the obtained predictive image and an image in the current picture to be coded. Here, "picture" is a term denoting one image. In the case of a progressive image, "picture" means a frame, whereas it means a frame or fields in the case of an interlaced image. Here, "interlaced image" is an image of a frame composed of two fields which are separated in capture time. In coding and decoding of an interlaced image, it is possible to handle one frame as a frame as it is, as two fields, or as a frame structure or a field structure on a per-block basis within the frame.

A picture to be coded using intra picture prediction without reference to any pictures shall be referred to as an I picture. A picture to be coded using inter picture prediction with reference to only one picture shall be referred to as a P picture. And, a picture to be coded using inter picture prediction with reference to two pictures at the same time shall be referred to as a B picture. It is possible for a B picture to refer to two pictures which can be arbitrarily combined from forward/backward pictures in display order. Reference images (reference pictures) can be determined for each block serving as a basic coding/decoding unit. Distinction shall be made between such reference pictures by calling a reference picture to be described earlier in a coded bitstream as a first reference picture, and by calling a reference picture to be described later in the bitstream as a second reference picture. Note that as a condition for coding and decoding these types of pictures, pictures used for reference are required to be already coded and decoded.

P pictures and B pictures are coded using motion compensated inter picture prediction. Coding by use of motion compensated inter picture prediction is a coding method that employs motion compensation in inter picture prediction coding. Unlike a method for performing prediction simply based on pixel values in a reference picture, motion estimation is a technique capable of improving prediction accuracy as well as reducing the amount of data by estimating the amount of motion (hereinafter referred to as "motion vector") of each part within a picture and further by performing prediction in consideration of such amount of motion. For example, it is possible to reduce the amount of data through motion compensation by estimating motion vectors of the current picture to be coded and then by coding prediction residuals between prediction values obtained by shifting only the amount of the respective motion vectors and the current picture to be coded. In this technique, motion vectors are also recorded or transmitted in coded form, since motion vector information is required at the time of decoding.

Motion vectors are estimated on a per-macroblock basis. More specifically, a macroblock shall be previously fixed in the current picture to be coded, so as to estimate motion vectors by finding the position of the most similar reference block of such fixed macroblock within the search area in a reference picture.

FIG. 1 is a diagram illustrating an example data structure of a bitstream. As FIG. 1 shows, the bitstream has a hierarchical structure such as below. The bitstream (Stream) is formed of more than one group of pictures (GOP). By using GOPs as basic coding units, it becomes possible to edit a moving picture as well as to make a random access. Each GOP is made up of plural pictures, each of which is one of I picture, P picture, and B picture. Each picture is further made up of plural slices. Each slice, which is a strip-shaped area within each picture, is made up of plural macroblocks. Moreover, each stream, GOP, picture, and slice includes a synchronization signal (sync) for indicating the ending point of each unit and a header (header) which is data common to said each unit.

Note that when data is carried not in a bitstream being a sequence of streams, but in a packet and the like being a piecemeal unit, the header and the data portion, which is the other part than the header, may be carried separately. In such a case, the header and the data portion shall not be incorporated into the same bitstream, as shown in FIG. 1. In the case of a packet, however, even when the header and the data portion are not transmitted contiguously, it is simply that the header corresponding to the data portion is carried in another packet. Therefore, even when the header and the data portion are not incorporated into the same bitstream, the concept of a coded bitstream described with reference to FIG. 1 is also applicable to packets.

Generally speaking, the human sense of vision is more sensitive to the low frequency components than to the high frequency components. Furthermore, since the energy of the low frequency components in a picture signal is larger than that of the high frequency components, picture coding is performed in order from the low frequency components to the high frequency components. As a result, the number of bits required for coding the low frequency components is larger than that required for the high frequency components.

In view of the above points, the existing coding methods use larger quantization steps for the high frequency components than for the low frequency components when quantizing transformation coefficients, which are obtained by orthogonal transformation, of the respective frequencies. This technique has made it possible for the conventional coding methods to achieve a large increase in compression ratio with a small loss of picture quality from the standpoint of viewers.

Meanwhile, since quantization step sizes of the high frequency components with regard to the low frequency components depend on picture signal, a technique for changing the sizes of quantization steps for the respective frequency components on a picture-by-picture basis has been conventionally employed. A quantization matrix is used to derive quantization steps of the respective frequency components. FIG. 2 shows an example quantization matrix. In this drawing, the upper left component is a direct current component, whereas rightward components are horizontal high frequency components and downward components are vertical high frequency components. The quantization matrix in FIG. 2 also indicates that a larger quantization step is applied to a larger value. Usually, it is possible to use different quantization matrices for each picture, and the matrix to be used is described in each picture header. Therefore, even if the same quantization matrix is used for all the pictures, it is described in each picture header and carried one by one.

Meanwhile, current MPEG-4 AVC does not include quantization matrix as in MPEG-2 and MPEG-4. This results in difficulty in achieving optimal subjective quality in the current MPEG-4 AVC coding scheme and other schemes using uniform quantization in all DCT or DCT-like coefficients. When such quantization matrix scheme is introduced, we have to allow the current provision of MPEG-4 AVC or other standards to carry the quantization matrices, in consideration of compatibility with the existing standards.

Additionally, because of the coding efficiency improvement, MPEG-4 AVC has been able to provide the potential to be used in various application domains. The versatility warrants the use of different sets of quantization matrices for different applications; different sets of quantization matrices for different color channels, etc. Encoders can select different quantization matrices depending on application or image to be coded. Because of that, we must develop an efficient quantization matrix definition and loading protocol to facilitate the flexible yet effective transmission of quantization matrix information.

DISCLOSURE OF INVENTION

The present invention has been conceived in view of the above circumstances, and it is an object of the present invention to provide a moving picture coding method and a moving picture decoding method that are capable of reducing the amount of data to be coded and improving coding efficiency.

In order to achieve the above objective, the moving picture coding method according to the present invention is a moving picture coding method for coding, on a block-by-block basis, each picture that makes up a moving picture, and generating a coded stream, the method comprising: transforming, on a block-by-block basis, each picture into coefficients representing spatial frequency components; quantizing the coefficients using a quantization matrix; generating identification information that identifies the quantization matrix used for quantization; and placing the identification information in the coded stream in predetermined units.

According to the above method, since there is no need to describe a quantization matrix used for quantization in the predetermined units, for example, picture, slice, macroblock or the like, it becomes possible to reduce the amount of data to be coded and thus perform coding of the data efficiently.

In the above method, the quantization matrix may be stored into the coded stream at a location that can be accessed before the data obtained by quantizing the coefficients using said quantization matrix can be retrieved.

Here, in the storage, the quantization matrix may be stored into a first parameter set or a second parameter set for holding information necessary for decoding, the first parameter set or the second parameter set being placed in the coded stream at the location that can be accessed before the data obtained by quantizing the coefficients using the quantization matrix can be retrieved.

According to the above method, it becomes possible to use, for decoding, the quantization matrix identified by the identification information.

In the above-mentioned moving picture coding method, a flag may be placed in the coded stream in predetermined units, the flag indicating switching between the quantization matrix identifiable by the identification information and a default quantization matrix.

According to the above method, it becomes possible to indicate switching between the quantization matrix identifiable by the identification information and the default quantization matrix, using the identification information.

The moving picture decoding method according to the present invention is a moving picture decoding method for decoding a coded stream obtained by coding each picture that makes up a moving picture through orthogonal transformation and quantization on a block-by-block basis, the method comprising: holding at least one quantization matrix; extracting, in predetermined units, identification information that identifies a quantization matrix used for quantization, from the coded stream; identifying the quantization matrix based on the identification information from the at least one held quantization matrix; performing inverse quantization of each coded picture on a block-by-block basis using the identified quantization matrix; and decoding the coded picture by performing inverse orthogonal transformation on inverse quantized coefficients indicating spatial frequency components.

According to the above method, it becomes possible to decode a coded stream in which only the matrix ID for identifying the quantization matrix used for quantization is placed in predetermined units, such as picture, slice, macroblock or the like, while the quantization matrix has previously been carried separately.

In the above-mentioned moving picture decoding method, at least one quantization matrix may be extracted from the coded stream, and in the holding, the quantization matrix extracted from the coded stream may be held.

Here, in the extracting, the quantization matrix may be extracted from a first parameter set or a second parameter set in which information necessary for decoding is stored.

According to the above method, it becomes possible to use the quantization matrix identified by the identification information.

In the above-mentioned moving picture decoding method, a flag may be extracted from the coded stream in predetermined units, the flag indicating switching between the quantization matrix identified by the identification information and a default quantization matrix, and in the identifying, the quantization matrix identified by the identification information and the default quantization matrix may be switched.

According to the above method, it becomes possible to switch between the quantization matrix identified by the identification information and the default quantization matrix, based on the flag.

In the above method, each picture is made up of luma components and two types of chroma components, and in the identifying, in the case where there is no quantization matrix for chroma components in the quantization matrices identified based on the identification information, a quantization matrix for luma components may be identified as the quantization matrix to be used.

Also, each picture is made up of a luma component and two types of chroma components, and in the identifying, in the case where there is no quantization matrix for chroma components of a type corresponding to current decoding in the quantization matrices identified based on the identification information, a quantization matrix for another type of chroma components may be identified as the quantization matrix to be used.

According to the above method, it becomes possible to decode a coded stream even if there is no quantization matrix for chroma.

Furthermore, not only is it possible to embody the present invention as a moving picture coding method and a moving picture decoding method, but also as a moving picture coding apparatus and a moving picture decoding apparatus that include, as steps, the characteristic units included in such moving picture coding method and moving picture decoding method. It is also possible to embody them as programs that cause a computer to execute these steps, or as streams coded by the moving picture coding method. It should be noted that such programs and coded streams can be distributed on a recording medium such as a CD-ROM and via a transmission medium such as the Internet.

As is obvious from the above explanation, according to the moving picture coding method and the moving picture decoding method of the present invention, it becomes possible to reduce an amount of data to be coded and achieve efficient coding and decoding.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 2 is a diagram showing an example quantization matrix;

FIG. 5 is a diagram showing a part of a structure of a sequence parameter set;

FIG. 6 is a diagram showing a part of a structure of a picture parameter set;

FIG. 7 is a diagram showing an example description of quantization matrices in a parameter set;

FIG. 13A is a diagram illustrating an example physical format of a flexible disk as a main body of a recording medium, FIG. 13B is a full appearance of the flexible disk viewed from the front thereof, a cross-sectional view thereof and the flexible disk itself, and FIG. 13C is a diagram illustrating a structure for recording and reproducing the above program on and from the flexible disk;

BEST MODE FOR CARRYING OUT THE INVENTION

The embodiments of the present invention are described by referring to diagrams.

First Embodiment

Figure 1:
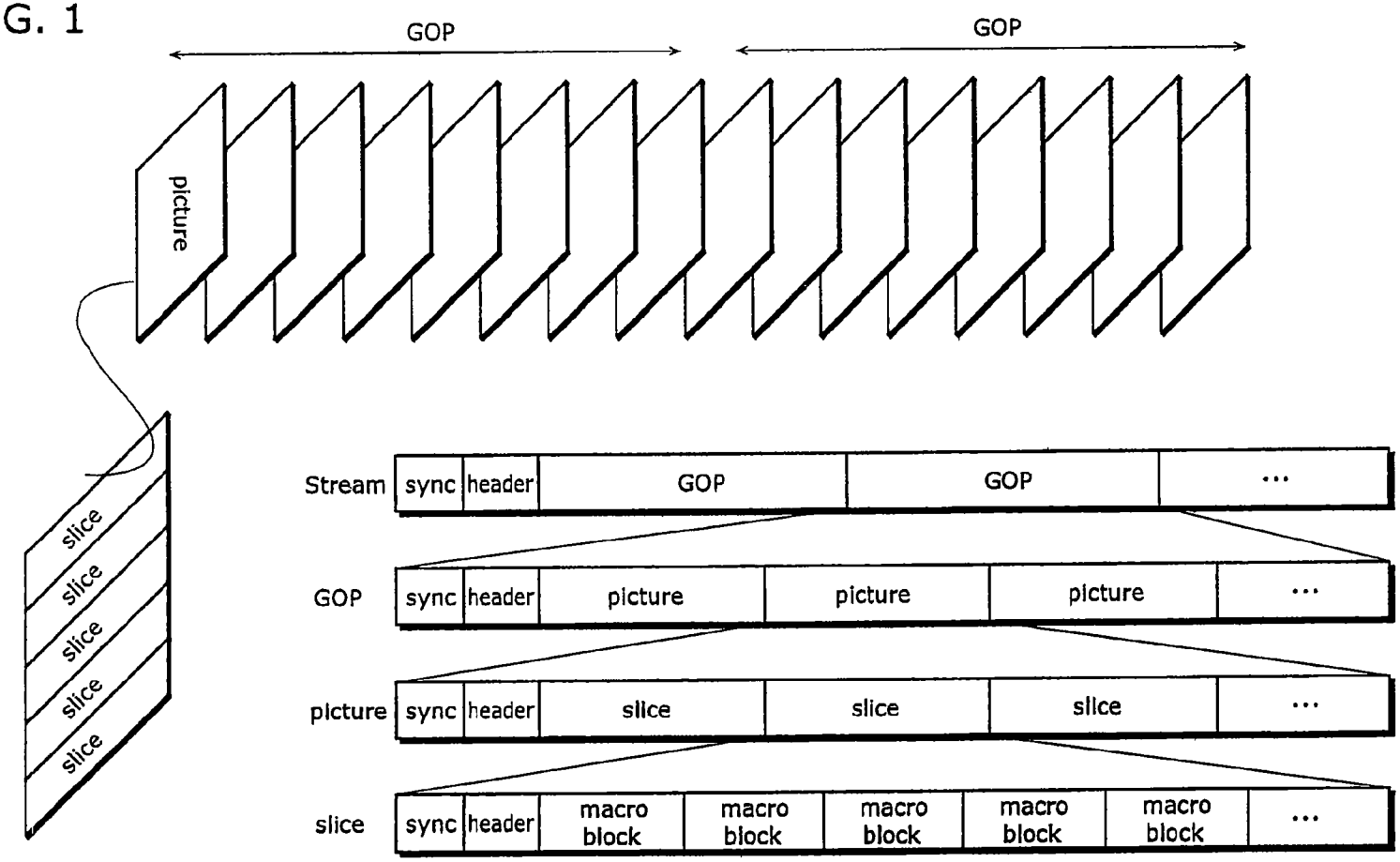
FIG. 1 is a diagram illustrating an example data structure of a bitstream.
Figure 3:
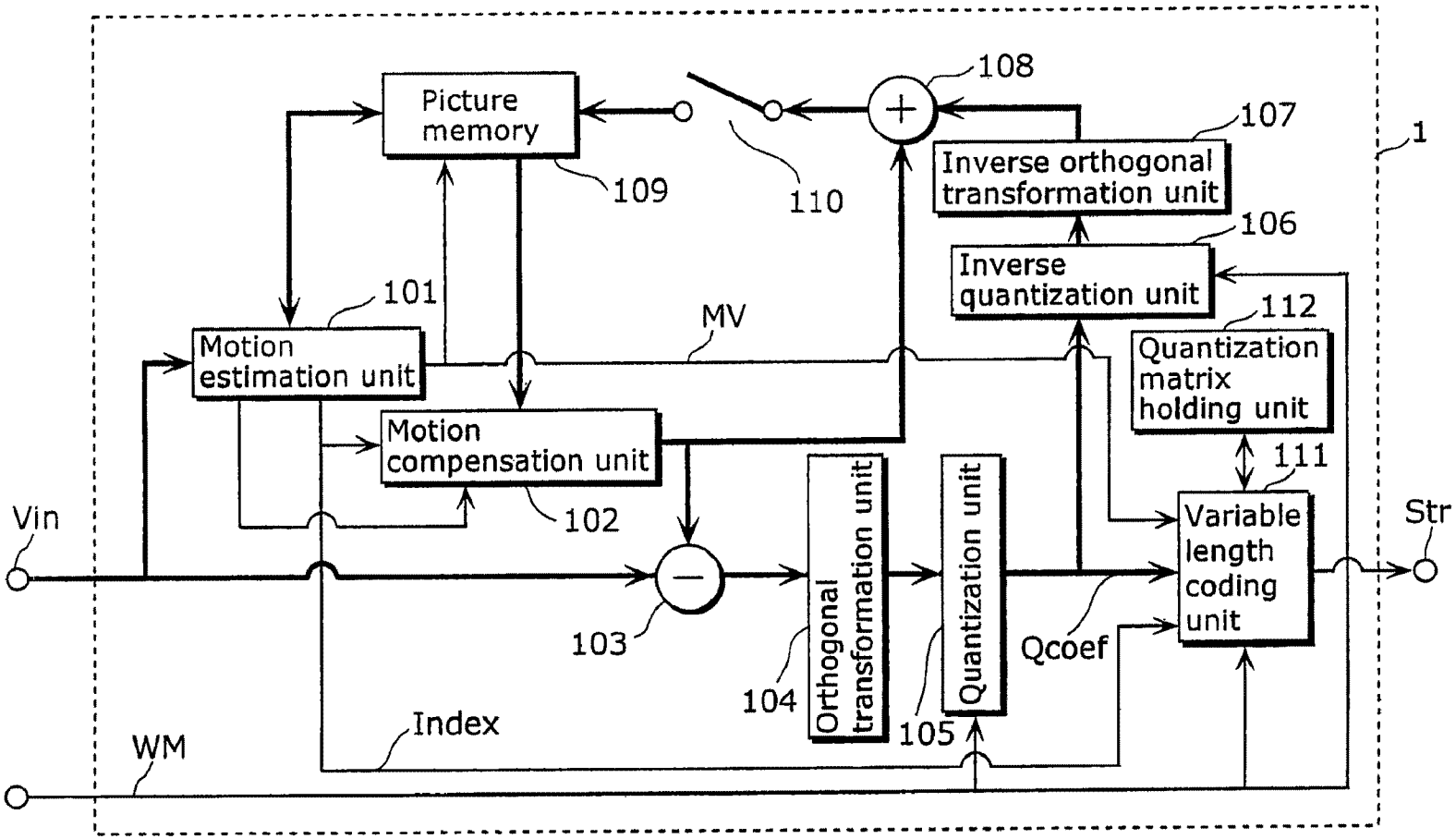
FIG. 3 is a block diagram showing a structure of a moving picture coding apparatus that embodies the moving picture coding method according to the present invention.

FIG. 3 is a block diagram showing the structure of a moving picture coding apparatus that embodies the moving picture coding method of the present invention.

A picture coding apparatus 1 is an apparatus for performing compression coding on an input picture signal Vin and outputting a coded stream Str which has been coded into a bitstream by performing variable length coding and the like. As shown in FIG. 3, such picture coding apparatus 3 is comprised of a motion estimation unit 101, a motion compensation unit 102, a subtraction unit 103, an orthogonal transformation unit 104, a quantization unit 105, an inverse quantization unit 106, an inverse orthogonal transformation unit 107, an addition unit 108, a picture memory 109, a switch 110, a variable length coding unit 111 and a quantization matrix holding unit 112.

The picture signal Vin is inputted to the subtraction unit 103 and the motion estimation unit 101. The subtraction unit 103 calculates residual pixel values between each image in the input picture signal Vin and each predictive image, and outputs the calculated residual pixel values to the orthogonal transformation unit 104. The orthogonal transformation unit 104 transforms the residual pixel values into frequency coefficients, and outputs them to the quantization unit 105. The quantization unit 105 quantizes the inputted frequency coefficients using inputted quantization matrix WM, and outputs the resulting quantized values Qcoef to the variable length coding unit 111.

The inverse quantization unit 106 performs inverse quantization on the quantized values Qcoef using the inputted quantization matrix WM, so as to turn them into the frequency coefficients, and outputs them to the inverse orthogonal transformation unit 107. The inverse orthogonal transformation unit 107 performs inverse frequency transformation on the frequency coefficients so as to transform them into residual pixel values, and outputs them to the addition unit 108. The addition unit 108 adds the residual pixel values and each predictive image outputted from the motion estimation unit 102, so as to form a decoded image. The switch 110 turns ON when it is indicated that such decoded image should be stored, and such decoded image is to be stored into the picture memory 109.

Meanwhile, the motion estimation unit 101, which receives the picture signal Vin on a macroblock basis, detects an image area closest to an image signal in such inputted picture signal Vin within a decoded picture stored in the picture memory 109, and determines motion vector(s) MV indicating the position of such area. Motion vectors are estimated for each block, which is obtained by further dividing a macroblock. When this is done, it is possible to use more than one picture as reference pictures. Here, since a plurality of pictures can be used as reference pictures, identification numbers (reference indices Index) to identify the respective reference pictures are required on a block-by-block basis. With the use of the reference indices Index, it is possible to identify each reference picture by associating each picture stored in the picture memory 109 with the picture number designated to such each picture.

The motion compensation unit 102 selects, as a predictive image, the most suitable image area from among decoded pictures stored in the picture memory 109, using the motion vectors detected in the above processing and the reference indices Index.

The quantization matrix holding unit 112 holds the quantization matrix WM which has already been carried as a part of a parameter set and the matrix ID that identifies this quantization matrix WM in the manner in which they are associated with each other.

The variable length coding unit 111 obtains, from the quantization matrix holding unit 112, the matrix ID corresponding to the quantization matrix WM used for quantization. The variable length coding unit 111 also performs variable length coding on the quantization values Qcoef, the matrix IDs, the reference indices Index, the picture types Ptype and the motion vectors MV so as to obtain a coded stream Str.

Figure 4:
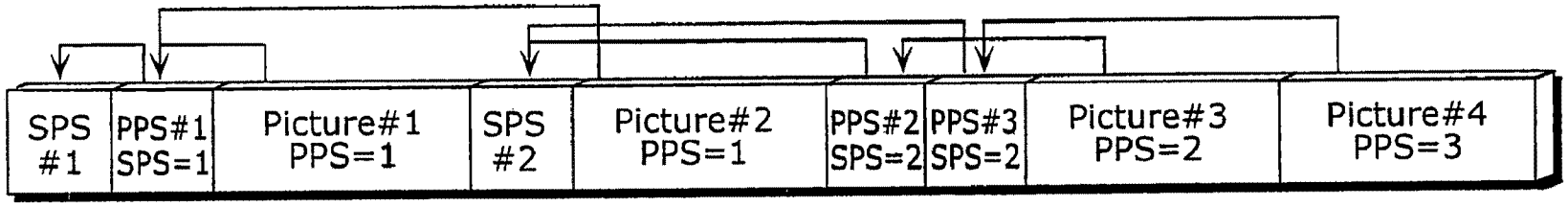
FIG. 4 is a diagram showing correspondence between sequence parameter sets and picture parameter sets and pictures.

FIG. 4 is a diagram showing the correspondence between sequence parameter sets and picture parameter sets and pictures. FIG. 5 is a diagram showing a part of a structure of a sequence parameter set, and FIG. 6 is a diagram showing a part of a structure of a picture parameter set. While a picture is made up of slices, all the slices included in the same picture have identifiers indicating the same picture parameter set.

In MPEG-4 AVC, there is no concept of a header, and common data is placed at the top of a sequence under the designation of a parameter set. There are two types of parameter sets, a picture parameter set PPS that is data corresponding to the header of each picture, and a sequence parameter set SPS corresponding to the header of a GOP or a sequence in MPEG-2. A sequence parameter set SPS includes the number of pictures that are available as reference pictures, image size and the like, while a picture parameter set PPS includes a type of variable length coding (switching between Huffman coding and arithmetic coding), default values of quantization matrices, the number of reference pictures, and the like.

An identifier is assigned to a sequence parameter set SPS, and to which sequence a picture belongs is identified by specifying this identifier in a picture parameter set PPS. An identifier is also assigned to a picture parameter set PPS, and which picture parameter set PPS is to be used is identified by specifying this identifier in a slice.

For example, in the example shown in FIG. 4, a picture #1 includes the identifier (PPS=1) of a picture parameter set PPS to be referred to by a slice included in the picture #1. The picture parameter set PPS #1 includes the identifier (SPS=1) of a sequence parameter set to be referred to.

Furthermore, the sequence parameter set SPS and the picture parameter set PPS respectively include flags 501 and 601 indicating whether or not quantization matrices are carried as shown in FIG. 5 and FIG. 6, and in the case where the quantization matrices are to be carried, quantization matrices 502 and 602 are respectively described therein.

The quantization matrix can be changed adaptively to the unit of quantization (for example, horizontal 4×vertical 4 pixels and horizontal 8×vertical 8 pixels).

FIG. 7 is a diagram showing an example description of quantization matrices in a parameter set.

Since a picture signal Vin consists of luma components and two types of chroma components, it is possible to use different quantization matrices for luma components and two types of chroma components separately when performing quantization. It is also possible to use different quantization matrices for intra-picture coding and inter-picture coding separately.

Therefore, for example, as shown in FIG. 7, it is possible to describe quantization matrices for a unit of quantization, luma components and two types of chroma components, and intra-picture coding and inter-picture coding, respectively.

Figure 8:
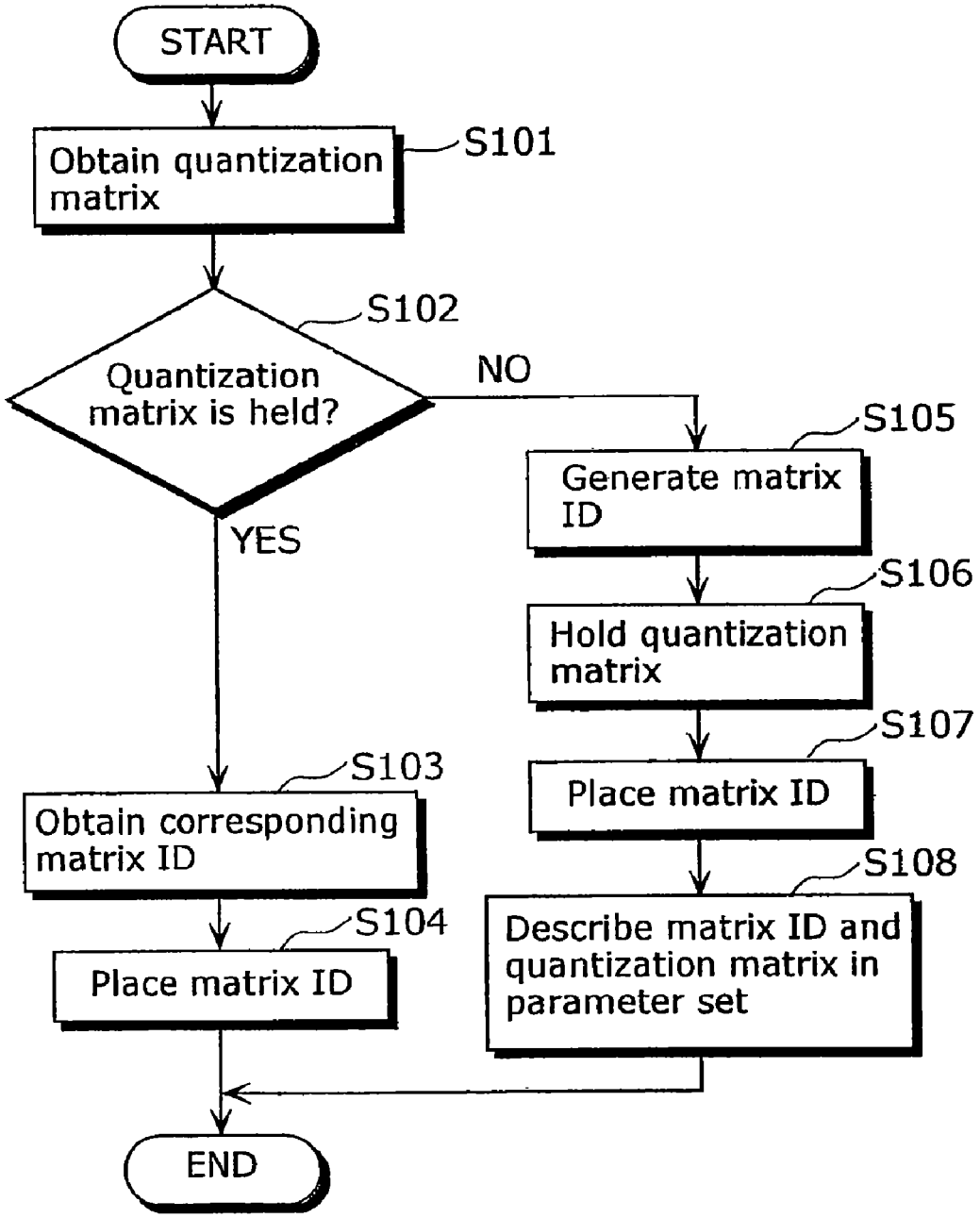
FIG. 8 is a flowchart showing operations for placing a matrix ID.

The operations for placing matrix IDs in the above-structured moving picture coding apparatus are explained. FIG. 8 is a flowchart showing the operations for placing a matrix ID.

The variable length coding unit 111 obtains a quantization matrix WM used for quantization (Step S101). Next, the variable length coding unit 111 judges whether or not the obtained quantization matrix WM is held in the quantization matrix holding unit 112 (Step S102). Here, in the case whether the obtained quantization matrix WM is held in the quantization matrix holding unit 112 (YES in Step S102), the variable length coding unit 111 obtains the matrix ID corresponding to the obtained quantization matrix WM from the quantization matrix holding unit 112 (Step S103). Then, the variable length coding unit 111 places the obtained matrix ID in predetermined units (for example, per picture, slice or macroblock) (Step S104).

On the other hand, in the case where the obtained quantization matrix WM is not held in the quantization matrix holding unit 112 (NO in Step S102), the quantization matrix holding unit 112 generates the matrix ID for this quantization matrix WM (Step S105). Then, the quantization matrix holding unit 112 holds this quantization matrix WM and the matrix ID in the manner in which they are associated with each other (Step S106). The variable length coding unit 111 places the generated matrix ID in predetermined units (for example, per picture, slice or macroblock) (Step S107). The variable length coding unit 111 describes the generated matrix ID and the quantization matrix WM in the parameter set (Step S108). Note that the parameter set in which these matrix ID and quantization matrix WM are described is carried earlier, in a coded stream Str, than the predetermined units (that is, coded data quantized using this quantization matrix WM) to which this matrix ID is placed.

As described above, since quantization matrices WM are described in a parameter set and carried while only the matrix ID that identifies the quantization matrix WM used in predetermined units (for example, per picture, slice or macroblock) is placed therein, there is no need to describe the quantization matrix WM used in every predetermined unit. Therefore, it becomes possible to reduce the amount of data to be coded and achieve efficient coding.

Note that it is possible to update a quantization matrix WM carried in a sequence parameter set SPS and carry the updated one (with the same matrix ID) in a picture parameter set PPS. In this case, the updated quantization matrix WM is used only when the picture parameter set PPS is referenced.

It is also possible to include in a coded stream a flag indicating switching between the default quantization matrix WM and the quantization matrix WM identified by a matrix ID. In this case, the default quantization matrix WM is replaced with the quantization matrix WM identified by the matrix ID according to the flag.

Figure 9:
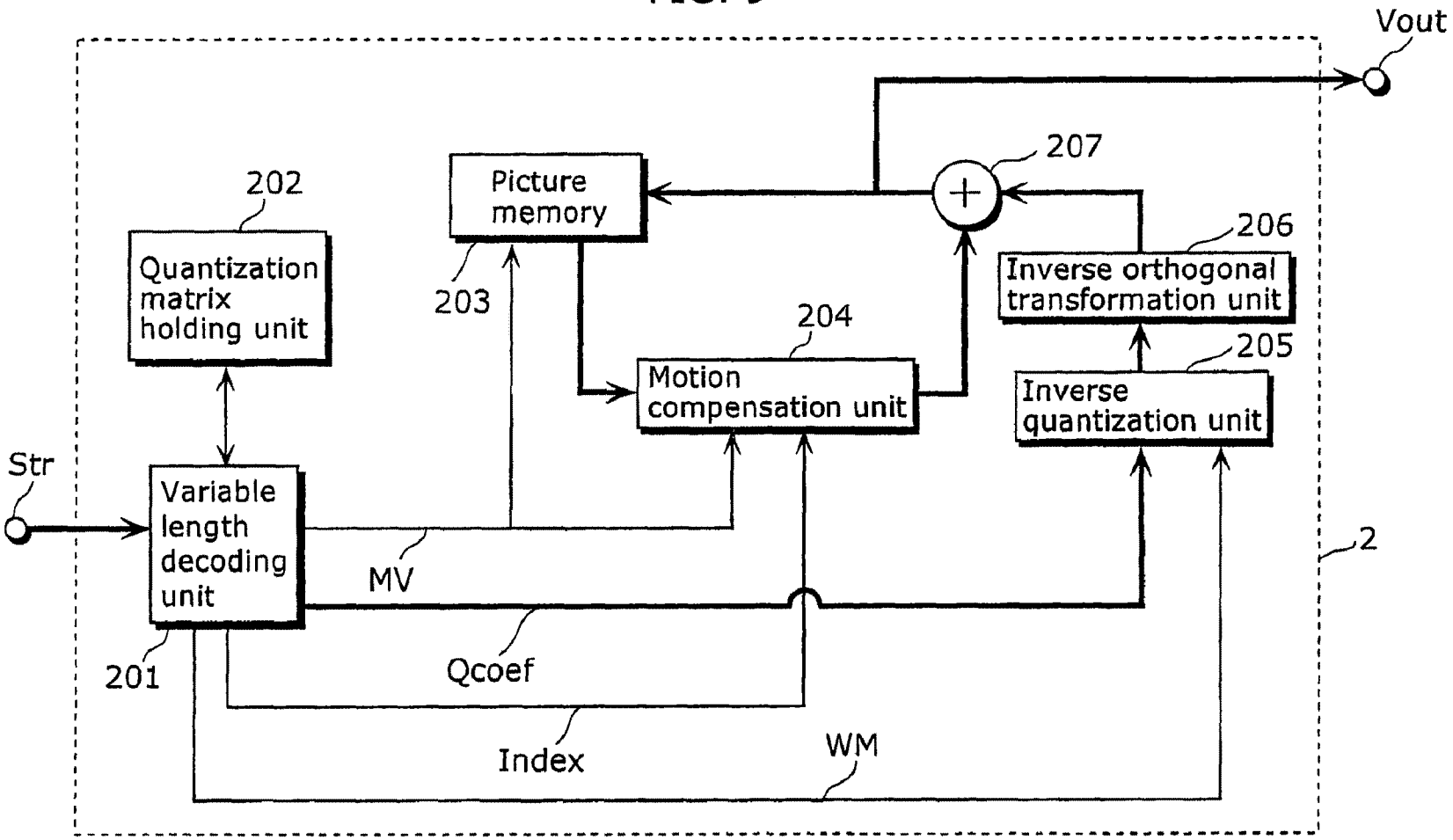
FIG. 9 is a block diagram showing a structure of a moving picture decoding apparatus that embodies the moving picture decoding method according to the present invention.

FIG. 9 is a block diagram showing a structure of a moving picture decoding apparatus that embodies the moving picture decoding method according to the present invention.

The moving picture decoding apparatus 2 is an apparatus that decodes a coded stream obtained by the coding by the moving picture coding apparatus 1 as described above, and includes a variable length decoding unit 201, a quantization matrix holding unit 202, a picture memory 203, a motion compensation unit 204, an inverse quantization unit 205, an inverse orthogonal transformation unit 206 and an addition unit 207.

The variable length decoding unit 201 decodes the coded stream Str, and outputs quantized values Qcoef, reference indices Index, picture types Ptype and motion vectors MV. The variable length decoding unit 201 also decodes the coded stream, identifies a quantization matrix WM based on an extracted matrix ID, and outputs the identified quantization matrix WM.

The quantization matrix holding unit 202 associates the quantization matrix WM which has already been carried in a parameter set with the matrix ID that identifies this quantization matrix WM, and holds them.

The quantized values Qcoef, reference indices Index and motion vectors MV are inputted to the picture memory 203, the motion compensation unit 204 and the inverse quantization unit 205, and decoding processing is performed on them. The operations for the decoding are same as those in the moving picture coding apparatus 1 shown in FIG. 3.

Figure 10:
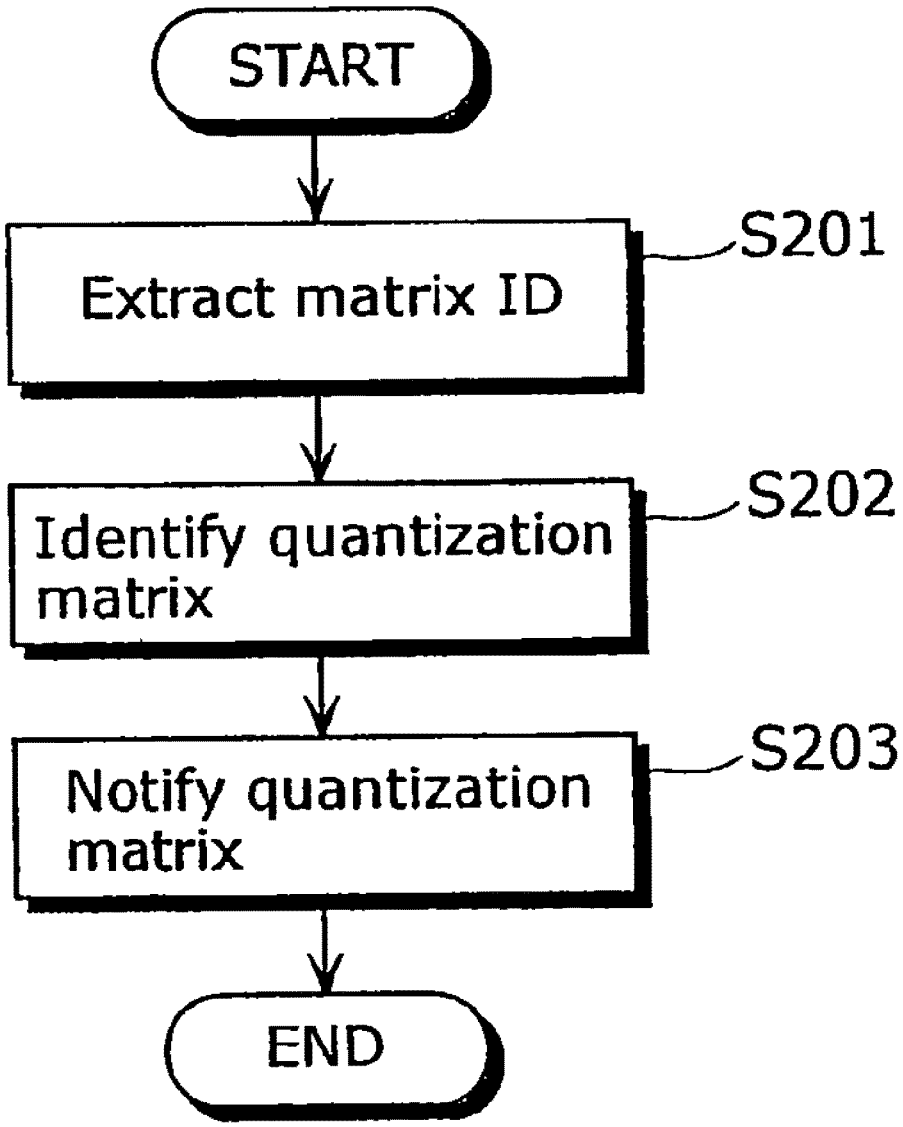
FIG. 10 is a flowchart showing operations for identifying a quantization matrix.

Next, the operations for identifying a quantization matrix in the above-structured moving picture decoding apparatus are explained. FIG. 10 is a flowchart showing the operations for identifying a quantization matrix.

The variable length decoding unit 201 decodes a coded stream Str and extracts a matrix ID placed in predetermined units (Step S201). Next, the variable length decoding unit 201 identifies a quantization matrix WM from among quantization matrices held in the quantization matrix holding unit 202, based on the extracted matrix ID (Step S202). Then, the variable length decoding unit 201 outputs the identified quantization matrix WM to the inverse quantization unit 205 (Step S203).

As described above, while a quantization matrices WM are described in a parameter set and carried, it is possible, in predetermined units (for example, per picture, per slice or per macroblock), to decode a coded stream in which only the matrix ID that identifies the used quantization matrix WM is placed.

Note that quantization matrices WM are described in a parameter set and carried in the present embodiment but the present invention is not limited to such case. For example, quantization matrices may be previously transmitted separately from a coded stream.

By the way, since a picture signal Vin is made up of luma components and two types of chroma components as described above, it is possible to use different quantization matrices separately for luma components and two types of chroma components for quantization. It is also possible to use an uniform quantization matrix for all the components.

Figure 11:
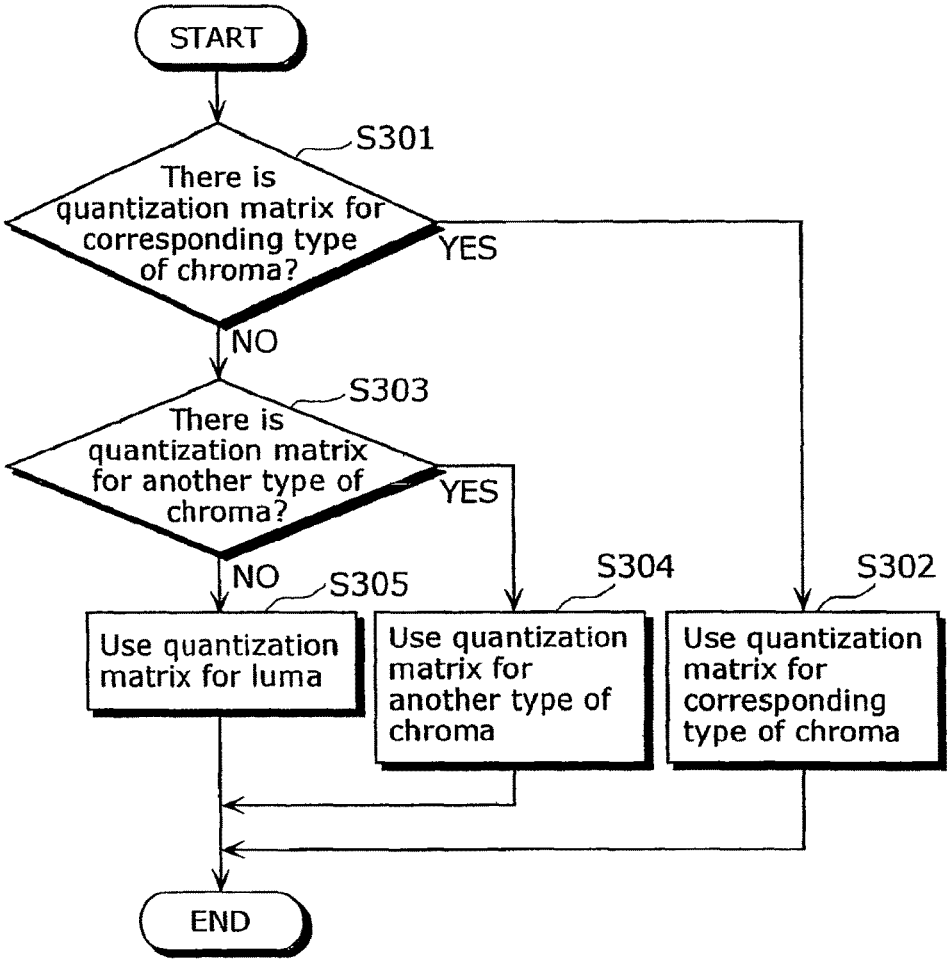
FIG. 11 is a flowchart showing operations for identifying a quantization matrix to be used for chroma components.

Next, the operations for identifying quantization matrices to be used for chroma components are explained. FIG. 11 is a flowchart showing the operations for identifying quantization matrices to be used for chroma components.

The variable length decoding unit 201 judges whether or not there is a quantization matrix for chroma components of the type corresponding to the current decoding among the quantization matrices WM identified as mentioned above (Step S301). For example, in the case where a quantized value Qcoef to be decoded is a first chroma component, it judges whether or not there is a quantization matrix for the first chroma components. In the case where a quantized value Qcoef to be decoded is a second chroma component, it judges whether or not there is a quantization matrix for the second chroma components. Here, if there is a quantization matrix for the corresponding type of chroma components (YES in Step S301), it outputs the corresponding chroma quantization matrix to the inverse quantization unit 205 as a matrix to be used (Step S302).

On the other hand, if there is no such corresponding chroma quantization matrix (NO in Step S301), the variable length decoding unit 201 judges whether or not there is a quantization matrix for another type of chroma components (Step S303). For example, in the case where a quantized value Qcoef to be decoded is a first chroma component, it judges whether or not there is a quantization matrix for the second chroma components. In the case where a quantized value Qcoef to be decoded is a second chroma component, it judges whether or not there is a quantization matrix for the first chroma components. Here, if there is a corresponding quantization matrix for another type of chroma components (YES in Step S303), it outputs the quantization matrix for another type of chroma components to the inverse quantization unit 205 as a matrix to be used (Step S304). On the other hand, if there is no quantization matrix for another type of chroma components (NO in Step S303), it outputs the quantization matrix for the luma components to the inverse quantization unit 205 as a matrix to be used (Step S305).

As a result, it becomes possible to decode a coded stream even if there is no chroma quantization matrix.

Second Embodiment

The key points in the present embodiment are as follows.

1. If there are multiple sequence-level stream description data structures selectable by a different part of a video bitstream, the quantization matrix shall be carried in a data structure separate from any of the sequence header data structure.

2. Multiple quantization matrices customized by users are defined at the beginning of a sequence video stream. The quantization matrices shall be selectable at different pictures at different locations in a bitstream. MPEG-2 uses quantization matrix scheme but it did not use a set of matrices from which one of them can be selected. It has to reload a new matrix when a quantization matrix is updated.

3. How frequent the update would be performed is specified as syntax elements to apply the quantization updates, so that the quantization matrix update scheme is compatible with the above description. In the scheme of the present embodiment, MPEG-2 single effective quantization matrix and later update is only a special case of this update scheme.

Next, the overview of the present embodiment is described.

In some video coding standards, there may be several segments in a sequence that are encoded using different encoding configurations, and as such, they require different sequence or segment header descriptors for each segment in the sequence. As transmitting quantization matrix takes considerable number of bits, we place all quantization matrices used in a sequence somewhere separate from any of the sequence or segment headers. For segments of the sequence that use different sets of quantization matrices, it only needs to reference the quantization matrices, such as an identification number, rather than transmitting the matrix from an encoder to decoders every time the matrix is used, which is the mechanism that MPEG-2 has used.

All the quantization matrices that are not specified in the video coderc's specification should be defined and grouped together. The segment or block of the bitstream that carries these quantization matrices should be placed at the beginning of the bitstream of a sequence before any encoded video data are transmitted. As choices that can be made by different video codec standards, those quantization matrices can be included as part of the video elementary stream, or can be carried out-of-band, such as in transport stream or in packets or in files separate from the main body of the video stream.

In many codec specifications, such as MPEG-2, MPEG-4, there are lower-level data structures contained in a sequence segment, which organizes video data into "group of pictures", pictures, slices, layers, macroblocks, so on. If a sequence segment header or descriptor references more than one set of quantization matrices, the choices of which one set to use will be left to lower level data structure to specify. This will be discussed later in this disclosure.

For those sequence segments that references more than one set of quantization matrix, all the quantization matrices are carried in the beginning of a sequence. The decoder that has received all the quantization matrices shall keep these quantization in its memory in a way that, when the decoder references a particular quantization matrix, all the look up tables, if there are any, associated with the quantization matrices will be ready to use. In implementing the specification of the syntax, the capacity of the decoders has to be taken into consideration to fit the capacity limit into the application requirement the decoders fit to. Therefore, the number of quantization matrices available in any given time shall not exceed a certain range.

In case that the decoder capacity does not allow storage of more than one set of quantization matrices, whenever a new set of quantization matrices become needed, the previously stored quantization matrix set has to be removed from decoder memory before the new one can be stored and become effective. This scenario becomes the same as that MPEG-2 has used in its specification.

Figure 12:
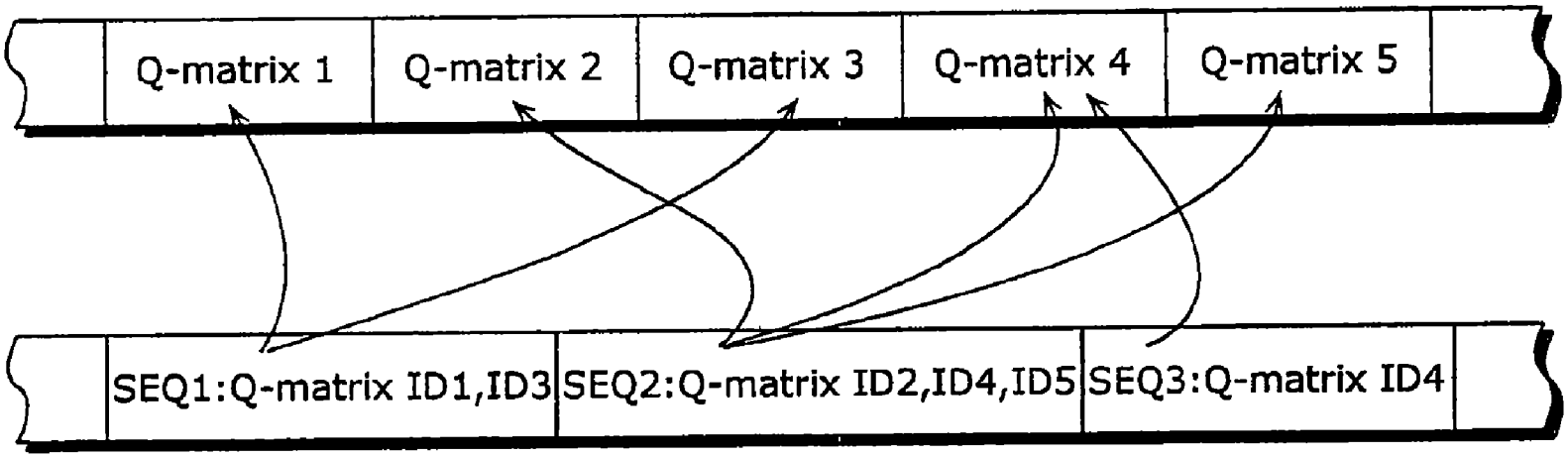
FIG. 12 is a diagram showing correspondence between quantization matrices carried as separate data and quantization matrices to be used for sequences.

FIG. 12 is a diagram showing correspondence between quantization matrices carried as separate data and quantization matrices to be used for a sequence.

In the example shown in FIG. 12, it is described that quantization matrices Q-matrix 1 and Q-matrix 3 are used in a sequence SEQ1. It is also described that quantization matrices Q-matrix 2, Q-matrix 4 and Q-matrix 5 are used in a sequence SEQ2, and a quantization matrix Q-matrix 4 is used in a sequence SEQ3.

Next, features in the syntax to support the use of quantization matrix are explained.

Quantization matrix can be fixed for an entire sequence or programs.

But the more flexible way to achieve better quality is to allow quantization scheme and quantization matrices to be changed dynamically. In such case, the issue is at what data level that kind of changes should be allowed. It is understood that depending on complexity allowed by an application domain, there will be restriction on the number of quantization matrix sets to be allowed at what data levels.

For all the stream data structure levels, that is, from sequence, segments, pictures, slices, to macroblocks, (macroblock has been used in almost all codec standards to mean 16×16 block of pixels, however, this dimension may change in proprietary or future codecs) we have in the bitstream a 6-bit flag containing the following bits (as shown in Table 1) to indicate what types of quantization are allowed to change at from one immediate lower level data to another. For example, in MPEG-4 AVC, the immediate lower level of "Sequence" is "Picture" and the immediate lower level of "Picture" is "Slice".

TABLE 1

| Bits representing quantization schemes and update rules | |
|---|---|
| Bit A | 1 bit for using only 4 × 4 uniform quantization |
| Bit B | 1 bit for using only 4 × 4 non-uniform quantization scheme |
| Bit C | 1 bit for allowing 4 × 4 quantization scheme changes—change from one quantization matrix set to another or changes from uniform quantization scheme to non-uniform quantization scheme. |
| Bit D | 1 bit for using only 8 × 8 uniform quantization |
| Bit E | 1 bit for using only 8 × 8 non-uniform quantization scheme |
| Bit F | 1 bit for allowing 8 × 8 quantization scheme changes—change from one quantization matrix set to another or changes from uniform quantization scheme to non-uniform quantization scheme. |

Note that when only Bit A is set and Bit B is not set, Bit C cannot be set. Similarly, when only Bit D is set and Bit E is not set, Bit F cannot be set.

When Bit B and Bit C are both set, it means quantization matrix set can change from one to another. One quantization matrix set contains one matrix per block coding mode. The block coding mode can be intra-prediction of certain direction, inter-predicted block, a bi-predicted block etc.

Bit C and Bit F indicate changes of quantization scheme or quantization matrix set or both. If the bit for 8×8 non-uniform quantization with quantization matrix is set in the Sequence level in MPEG-4 AVC, the quantization matrix used in one "Picture" data can be different from other "Picture" data.

At the highest level of data syntax, such as sequence header, if quantization matrix scheme is used, a default quantization set will be specified.

When Bit C or Bit F is set for a data level, there will a flag for each of the lower level data headers to indicate whether the default quantization matrix set will be used in these levels.

If the flag is positive in a lower data header, a new default quantization set for this data level will be defined and a 6-bit flag will be used at this data level to indicate whether the default will be changed in the further lower data level. This is followed in all data levels until the lowest level or the lowest level permitted by application requirement.

When Bit C or Bit F is not set, there will not be this flag in lower data headers, and the default will be automatically assumed.

There can be restrictions applicable in this recursive signaling method for transmitting information on quantization schemes, for example, restriction by the frequency of quantization matrix changes that has to be capped under a certain rate.

Next, default and customizable quantization matrices are explained.

In a video coding specification using non-uniform quantization matrix scheme, there may be several predefined matrices in a video codec specification. These default or prescribed matrices are known by compliant decoders and therefore there is no need to transfer the matrices to decoders. In similar way, these quantization matrices can be referenced in the same way as described above. When prescribed matrices are available, decoder shall add received customized matrices into its pool of quantization matrices. As described above, distinctive quantization matrices are indexed by identification numbers, which are assigned by encoder and transmitted to decoders.

In organizing the quantization matrices in bitstream syntax, the quantization of the same size can be grouped together. Information regarding whether a matrix should be used for inter-coded blocks or intra-coded blocks, or whether a matrix should be used for luma or chroma can also be noted in their attributes.

Next, update of a quantization matrix is explained.

Video codec bitstream syntax can allow quantization matrices already known to decoders to be added or updated.

When a quantization matrix is associated with a new identification number, this matrix is taken as a new quantization matrix and can be referenced by the new identification number. When the identification number has already been associated with a quantization matrix, the existing quantization matrix will be modified at decoders with the new matrix. Only quantization matrix of the same size as the old one can replace an old matrix. Encoder is responsible in keeping track of the active quantization matrices. During transmission of the updated quantization matrices, only the quantization matrix that needs to be updated is defined in the network packets.

Next, carriage of quantization matrices in MPEG-4 AVC is explained.

In MPEG-4 AVC, all video data and headers are packed into a bitstream layer called Network Abstract Layer (NAL). NAL is a sequence of many NAL units. Each NAL unit carries certain type of video data or data headers.

MPEG-4 AVC also defines several picture data groups under one data hierarchy. The hierarchy starts at Sequence, which is described by Sequence Parameter Set. A "Sequence" can have pictures using different Picture Parameter Sets. Under "Picture", there are slices, where slices have slice headers. A slice typically has many 16×16 blocks of pixels, called macroblocks.

When we introduce quantization matrix scheme into MPEG-4 AVC, we can have user defined quantization matrices or encoder-provided matrices be carried over NAL units. The use of NAL units can be implemented in three different ways.

(1) One NAL unit carries all the matrix information (including quantization tables) associated with each of the matrices.

(2) Several NAL units each carries certain type of quantization matrices and their information.

(3) Each NAL unit carries the definition of one quantization matrix.

In the case (1) and (2), the NAL units will also provide the total number of quantization matrices. In case 3, the total number of user-defined quantization matrices is not explicitly given by the video elementary stream. Both encoder and decoder must count the total as they go. An example of case 2 is when 4×4 quantization matrices and 8×8 quantization matrices are grouped and each is carried in a NAL.

In the sequence parameter set, MPEG-4 shall specify which quantization matrices it will use. It will define the 6-bit flag to indicate what quantization scheme will be used and whether it is allowed to change in the next level that is picture level, whose header is Picture Parameter Set.

The sequence parameter set that references a subset of the defined quantization matrices shall list all the quantization matrix IDs, which includes those default to the video codec specification, and those defined specifically for the content by codec operators. Sequence parameter sets can carry some common quantization parameters. A sequence parameter set can declare a set of default quantization matrices each for inter and intra prediction for each 8×8 and 4×4 block for luma and inter and intra for chroma. Picture parameter set, slice header, and macroblock level, however, can declare their own set of quantization matrices to override higher level specification. However these quantization matrices must be available in the Sequence Parameter Set currently available.

When quantization matrices are carried over NAL units, they can be transmitted at the beginning of the bitstream of the sequence. The position can be that it can either be located after or before the NAL unit carrying Sequence Parameter Sets. After the initial definition, additional customized quantization matrices can be inserted into bitstream to update or add new ones. The operation whether to add or to update is determined by the quantization matrix ID. If the ID exists, it is update. If the ID does not exist, the matrix will be added into the matrix pool.

Third Embodiment

Furthermore, if a program for realizing the moving picture coding method and the moving picture decoding method as shown in each of the aforementioned embodiments are recorded on a recording medium such as a flexible disk, it becomes possible to easily perform the processing presented in each of the above embodiments in an independent computer system.

Figure 13A:
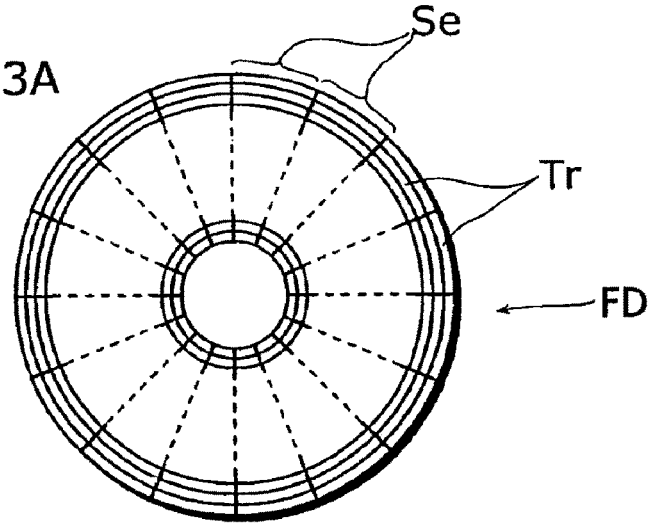
FIGS. 13A to 13C are diagrams illustrating a recording medium that stores a program for realizing, by a computer system, the moving picture coding method and the moving picture decoding method according to the above embodiments, and particularly.
Figure 13B:
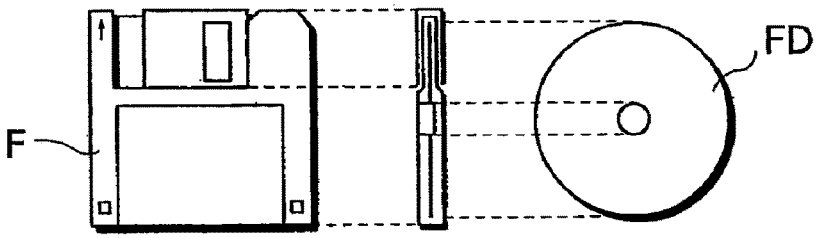
Figure 13C:
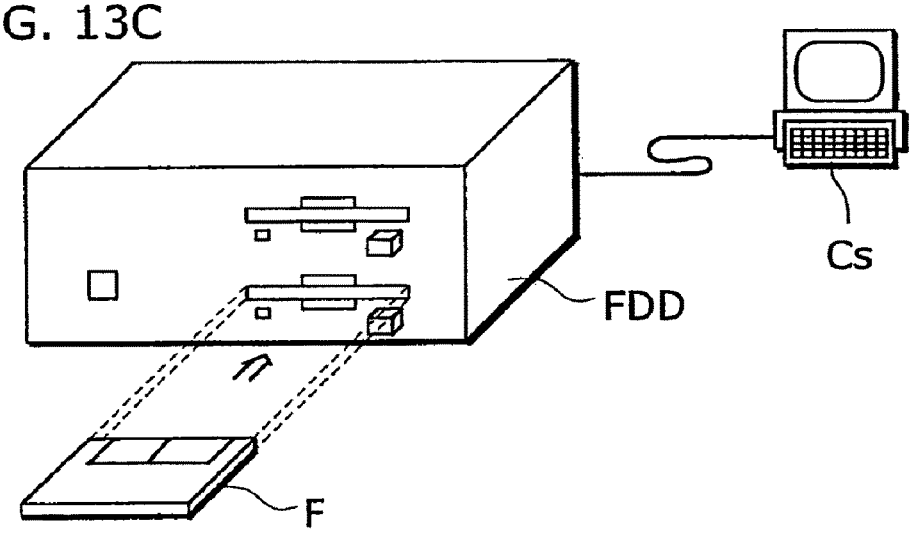

FIGS. 13A, 13B, and 13C are illustrations for realizing the moving picture coding method and the moving picture decoding method described in each of the above embodiments, using a program stored in a storage medium such as a flexible disk in a computer system.

FIG. 13B shows an external view of a flexible disk viewed from the front, its schematic cross-sectional view, and the flexible disk itself, while FIG. 13A illustrates an example physical format of the flexible disk as a recording medium itself. The flexible disk FD is contained in a case F, and a plurality of tracks Tr are formed concentrically on the surface of the flexible disk FD in the radius direction from the periphery, each track being divided into 16 sectors Se in the angular direction. Therefore, in the flexible disk storing the above-mentioned program, the program is recorded in an area allocated for it on the flexible disk FD.

Meanwhile, FIG. 13C shows the structure required for recording and reading out the program on and from the flexible disk FD. When the program realizing the above moving picture coding method and moving picture decoding method is to be recorded onto the flexible disk FD, such program shall be written by the use of the computer system Cs via a flexible disk drive FDD. Meanwhile, when the moving picture coding method and the moving picture decoding method are to be constructed in the computer system Cs through the program for realizing these methods on the flexible disk FD, the program shall be read out from the flexible disk FD via the flexible disk drive FDD and then transferred to the computer system Cs.

The above description is given on the assumption that a recording medium is a flexible disk, but an optical disc may also be used. In addition, the recording medium is not limited to this, and any other medium such as an IC card and a ROM cassette capable of recording a program can also be used.

Fourth Embodiment

The following describes application examples of the moving picture coding method and the moving picture decoding method as shown in the above embodiments as well as a system using them.

Figure 14:
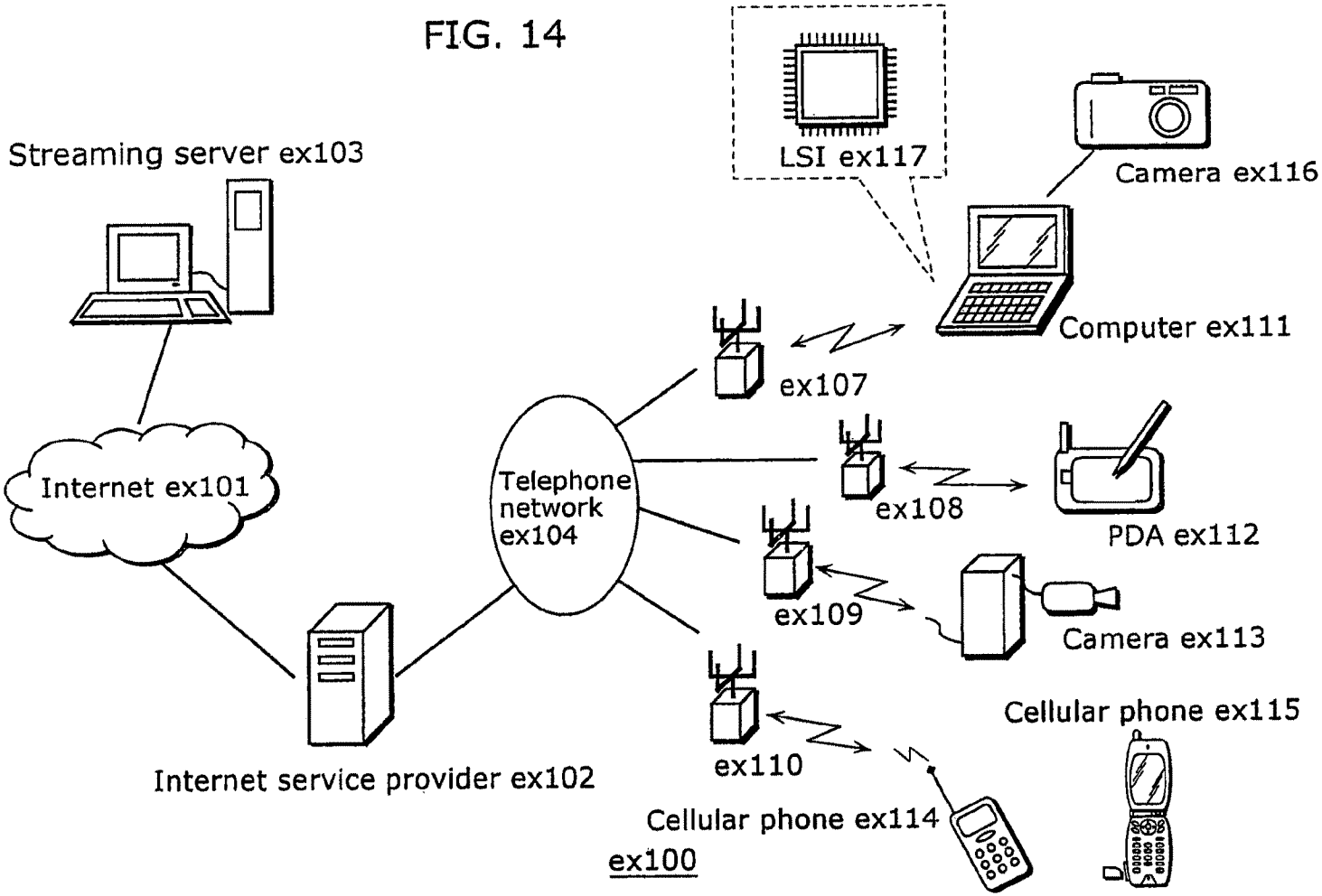
FIG. 14 is a block diagram showing an overall configuration of a content supply system that embodies a content distribution service.

FIG. 14 is a block diagram showing an overall configuration of a content supply system ex100 that realizes a content distribution service. The area for providing a communication service is divided into cells of desired size, and base stations ex107~ex110, which are fixed wireless stations, are placed in the respective cells.

In this content supply system ex100, devices such as a computer ex111, a PDA (Personal Digital Assistant) ex112, a camera ex113, a cellular phone ex114, and a camera-equipped cellular phone ex115 are respectively connected to the Internet ex101 via an Internet service provider ex102, a telephone network ex104, and the base stations ex107~ex110.

However, the content supply system ex100 is not limited to the combination as shown in FIG. 14, and may be connected to a combination of any of them. Also, each of the devices may be connected directly to the telephone network ex104, not via the base stations ex107~ex110, which are fixed wireless stations.

The camera ex113 is a device such as a digital video camera capable of shooting moving pictures. The cellular phone may be a cellular phone of a PDC (Personal Digital Communications) system, a CDMA (Code Division Multiple Access) system, a W-CDMA (Wideband-Code Division Multiple Access) system or a GSM (Global System for Mobile Communications) system, a PHS (Personal Handy-phone system) or the like, and may be any one of these.

Furthermore, a streaming server ex103 is connected to the camera ex113 via the base station ex109 and the telephone network ex104, which enables live distribution or the like based on coded data transmitted by the user using the camera ex113. Either the camera ex113 or a server and the like capable of performing data transmission processing may code the shot data. Also, moving picture data shot by a camera ex116 may be transmitted to the streaming server ex103 via the computer ex111. The camera ex116 is a device such as a digital camera capable of shooting still pictures and moving pictures. In this case, either the camera ex116 or the computer ex111 may code the moving picture data. In this case, an LSI ex117 included in the computer ex111 or the camera ex116 performs coding processing. Note that software for picture coding and decoding may be integrated into a certain type of storage medium (such as a CD-ROM, a flexible disk and a hard disk) that is a recording medium readable by the computer ex111 and the like. Furthermore, the camera-equipped cellular phone ex115 may transmit the moving picture data. This moving picture data is data coded by an LSI included in the cellular phone ex115.

In this content supply system ex100, content (e.g. a music live video) which has been shot by the user using the camera ex113, the camera ex116 or the like is coded in the same manner as the above-described embodiments and transmitted to the streaming server ex103, and the streaming server ex103 makes stream distribution of the content data to clients at their requests. The clients here include the computer ex111, the PDA ex112, the camera ex113, the cellular phone ex114 and so forth capable of decoding the above coded data. The content supply system ex100 with the above configuration is a system that enables the clients to receive and reproduce the coded data and realizes personal broadcasting by allowing them to receive, decode and reproduce the data in real time.

The moving picture coding apparatus and moving picture decoding apparatus presented in the above embodiments can be used for coding and decoding to be performed in each of the devices making up the above system.

An explanation is given of a cellular phone as an example.

Figure 15:
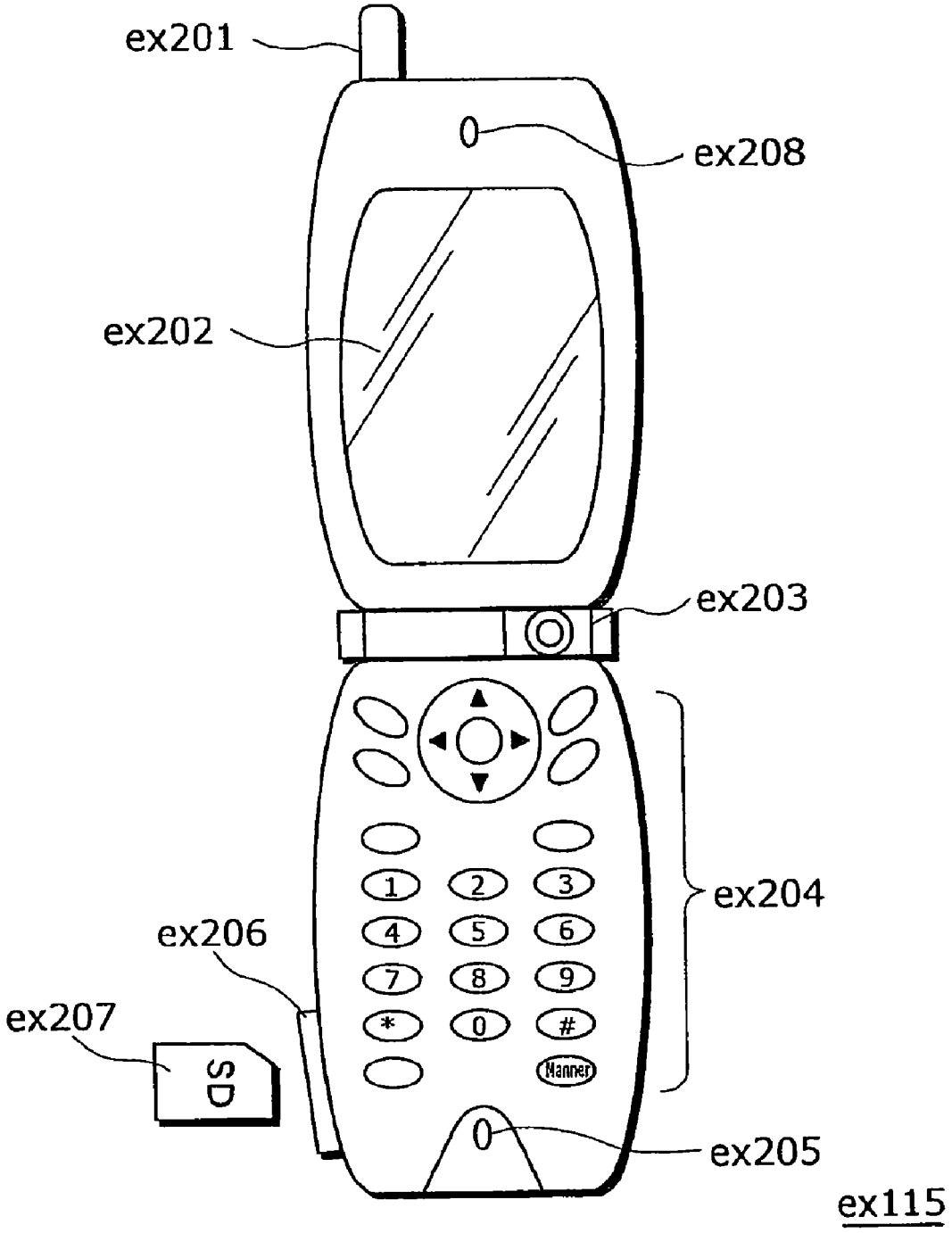
FIG. 15 is a diagram showing an example of a cellular phone.

FIG. 15 is a diagram showing the cellular phone ex115 that employs the moving picture coding method and the moving picture decoding method explained in the above embodiments. The cellular phone ex115 has an antenna ex201 for transmitting/receiving radio waves to and from the base station ex110, a camera unit ex203 such as a CCD camera capable of shooting video and still pictures, a display unit ex202 such as a liquid crystal display for displaying the data obtained by decoding video and the like shot by the camera unit ex203 and video and the like received by the antenna ex201, a main body equipped with a set of operation keys ex204, a voice output unit ex208 such as a speaker for outputting voices, a voice input unit ex205 such as a microphone for inputting voices, a recording medium ex207 for storing coded data or decoded data such as data of moving pictures or still pictures shot by the camera, data of received e-mails and moving picture data or still picture data, and a slot unit ex206 for enabling the recording medium ex207 to be attached to the cellular phone ex115. The recording medium ex207 is embodied as a flash memory element, a kind of EEPROM (Electrically Erasable and Programmable Read Only Memory) that is an electrically erasable and rewritable non-volatile memory, stored in a plastic case such as an SD card.

Figure 16:
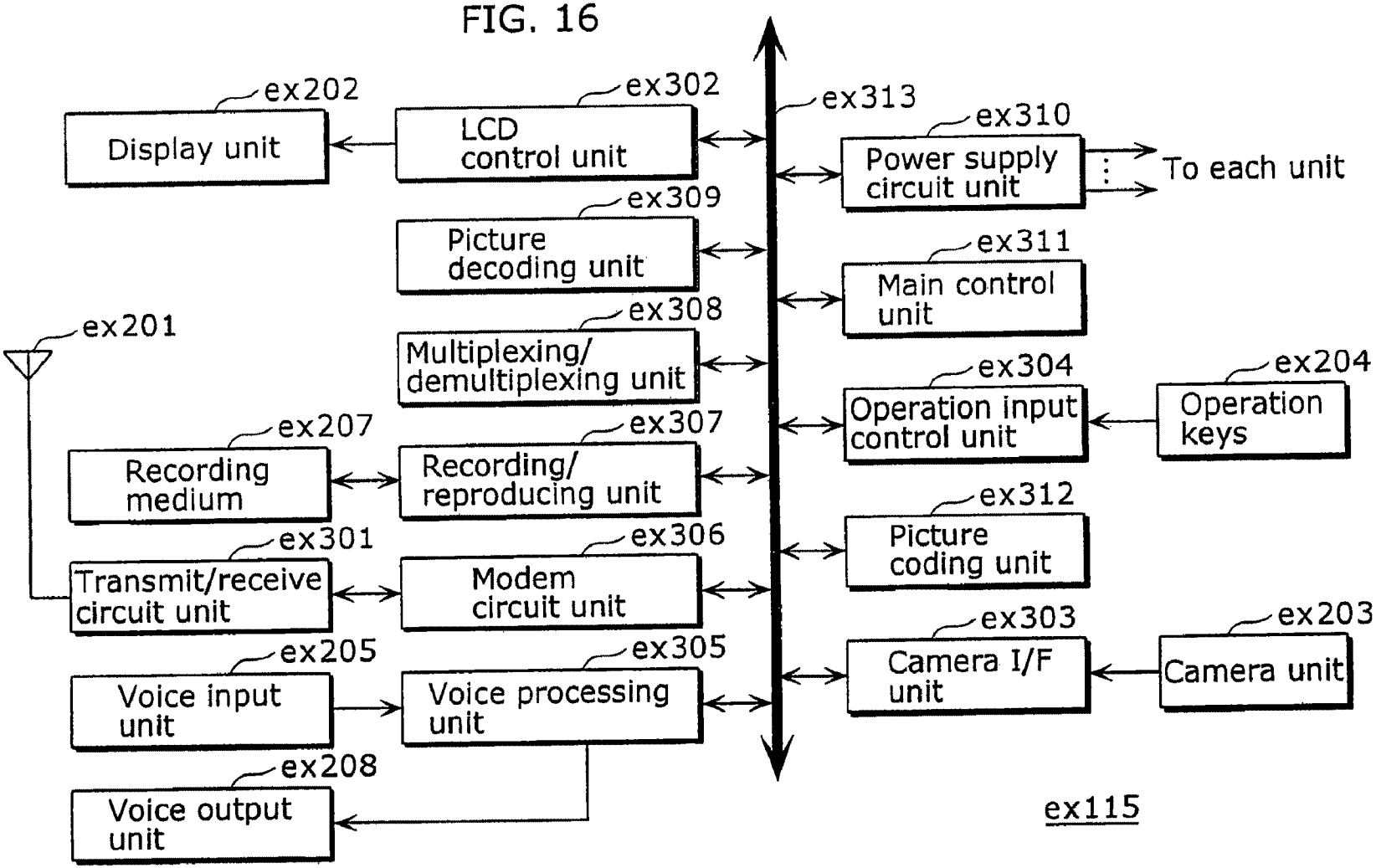
FIG. 16 is a block diagram showing an inner structure of the cellular phone.

Next, referring to FIG. 16, a description is given of the cellular phone ex115. In the cellular phone ex115, a main control unit ex311 for centrally controlling the display unit ex202 and each unit of the main body having the operation keys ex204 is configured in a manner in which a power supply circuit unit ex310, an operation input control unit ex304, a picture coding unit ex312, a camera interface unit ex303, an LCD (Liquid Crystal Display) control unit ex302, a picture decoding unit ex309, a multiplexing/demultiplexing unit ex308, a recording/reproducing unit ex307, a modem circuit unit ex306, and a voice processing unit ex305 are interconnected via a synchronous bus ex313.

When a call-end key or a power key is turned on by a user operation, the power supply circuit unit ex310 supplies each unit with power from a battery pack, and activates the camera-equipped digital cellular phone ex115 to make it into a ready state.

In the cellular phone ex115, the voice processing unit ex305 converts a voice signal received by the voice input unit ex205 in conversation mode into digital voice data under the control of the main control unit ex311 comprised of a CPU, a ROM, a RAM and others, the modem circuit unit ex306 performs spread spectrum processing on it, and a transmit/receive circuit unit ex301 performs digital-to-analog conversion processing and frequency transformation processing on the data, so as to transmit the resultant via the antenna ex201. Also, in the cellular phone ex115, data received by the antenna ex201 in conversation mode is amplified and performed of frequency transformation processing and analog-to-digital conversion processing, the modem circuit unit ex306 performs inverse spread spectrum processing on the resultant, and the voice processing unit ex305 converts it into analog voice data, so as to output it via the voice output unit ex208.

Furthermore, when sending an e-mail in data communication mode, text data of the e-mail inputted by operating the operation keys ex204 on the main body is sent out to the main control unit ex311 via the operation input control unit ex304. In the main control unit ex311, after the modem circuit unit ex306 performs spread spectrum processing on the text data and the transmit/receive circuit unit ex301 performs digital-to-analog conversion processing and frequency transformation processing on it, the resultant is transmitted to the base station ex110 via the antenna ex201.

When picture data is transmitted in data communication mode, the picture data shot by the camera unit ex203 is supplied to the picture coding unit ex312 via the camera interface unit ex303. When picture data is not to be transmitted, it is also possible to display such picture data shot by the camera unit ex203 directly on the display unit ex202 via the camera interface unit ex303 and the LCD control unit ex302.

The picture coding unit ex312, which includes the moving picture coding apparatus according to the present invention, performs compression coding on the picture data supplied from the camera unit ex203 using the coding method employed by the moving picture coding apparatus presented in the above embodiment, so as to convert it into coded picture data, and sends it out to the multiplexing/demultiplexing unit ex308. At this time, the cellular phone ex115 sends voices received by the voice input unit ex205 while the shooting by the camera unit ex203 is taking place, to the multiplexing/demultiplexing unit ex308 as digital voice data via the voice processing unit ex305.

The multiplexing/demultiplexing unit ex308 multiplexes the coded picture data supplied from the picture coding unit ex312 and the voice data supplied from the voice processing unit ex305 using a predetermined method, the modem circuit unit ex306 performs spread spectrum processing on the resulting multiplexed data, and the transmit/receive circuit unit ex301 performs digital-to-analog conversion processing and frequency transformation processing on the resultant, so as to transmit the processed data via the antenna ex201.

When receiving, in data communication mode, moving picture file data which is linked to a Web page or the like, the modem circuit unit ex306 performs inverse spread spectrum processing on the received signal received from the base station ex110 via the antenna ex201, and sends out the resulting multiplexed data to the multiplexing/demultiplexing unit ex308.

In order to decode the multiplexed data received via the antenna ex201, the multiplexing/demultiplexing unit ex308 separates the multiplexed data into a bitstream of picture data and a bitstream of voice data, and supplies such coded picture data to the picture decoding unit ex309 and such voice data to the voice processing unit ex305 via the synchronous bus ex313.

Next, the picture decoding unit ex309, which includes the moving picture decoding apparatus according to the present invention, decodes the bitstream of the picture data using the decoding method paired with the coding method shown in the above-mentioned embodiment so as to generate moving picture data for reproduction, and supplies such data to the display unit ex202 via the LCD control unit ex302. Accordingly, moving picture data included in the moving picture file linked to a Web page, for instance, is displayed. At the same time, the voice processing unit ex305 converts the voice data into an analog voice signal, and then supplies this to the voice output unit ex208. Accordingly, voice data included in the moving picture file linked to a Web page, for instance, is reproduced.

Figure 17:
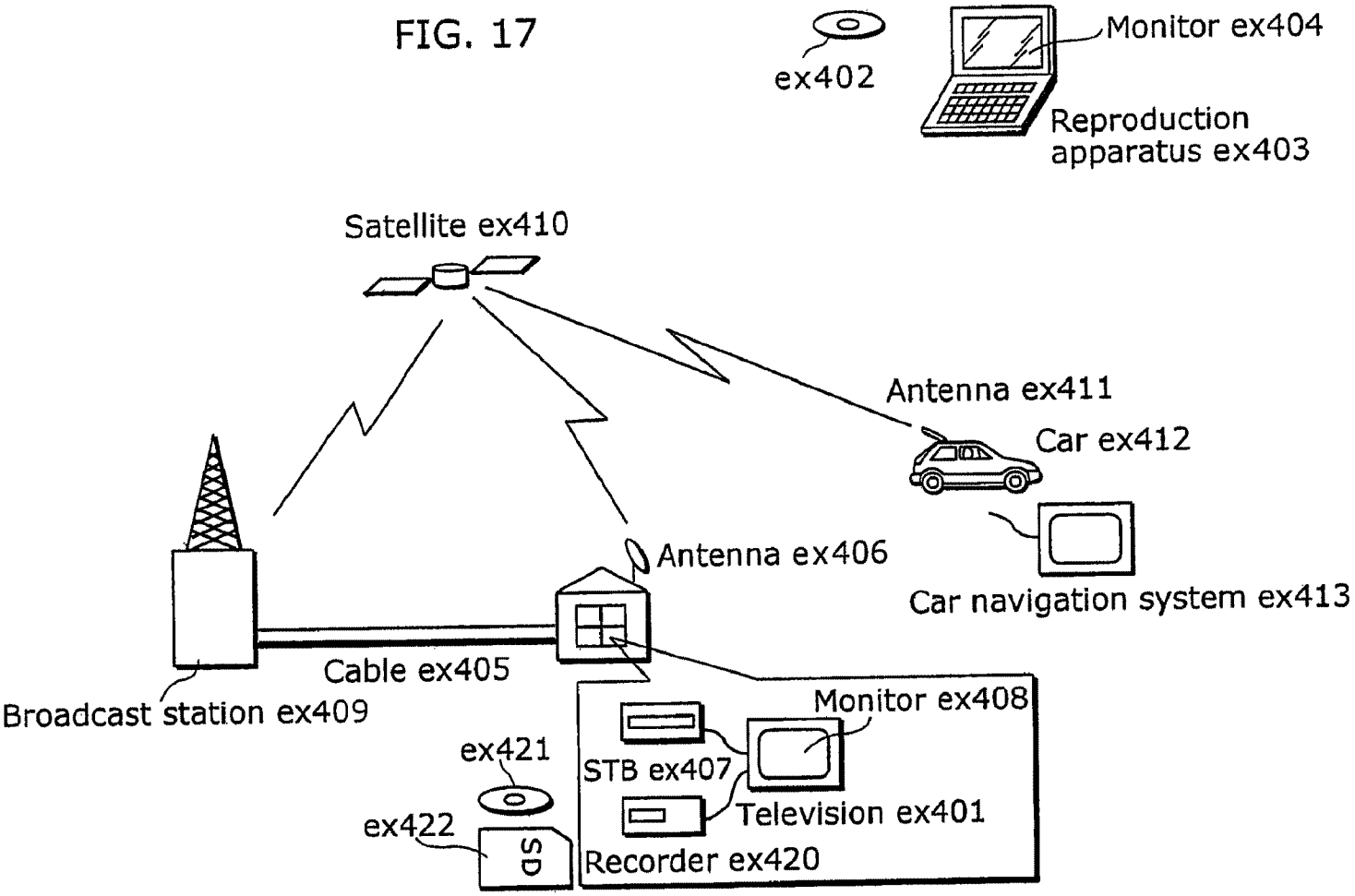
FIG. 17 is a diagram showing an overall configuration of a digital broadcasting system.

Note that the aforementioned system is not an exclusive example and therefore that at least either the moving picture coding apparatus or the moving picture decoding apparatus of the above embodiment can be incorporated into a digital broadcasting system as shown in FIG. 17, against the backdrop that satellite/terrestrial digital broadcasting has been a recent topic of conversation. To be more specific, at a broadcasting station ex409, a bitstream of video information is transmitted, by radio waves, to a satellite ex410 for communications or broadcasting. Upon receipt of it, the broadcast satellite ex410 transmits radio waves for broadcasting, an antenna ex406 of a house equipped with satellite broadcasting reception facilities receives such radio waves, and an apparatus such as a television (receiver) ex401 and a set top box (STP) ex407 decodes the bitstream and reproduces the decoded data. The moving picture decoding apparatus as shown in the above-mentioned embodiment can be implemented in the reproduction apparatus ex403 for reading and decoding the bitstream recorded on a storage medium ex402 that is a recording medium such as a CD and a DVD. In this case, a reproduced video signal is displayed on a monitor ex404. It is also conceivable that the moving picture decoding apparatus is implemented in the set top box ex407 connected to a cable ex405 for cable television or the antenna ex406 for satellite/terrestrial broadcasting so as to reproduce it on a television monitor ex408. In this case, the moving picture decoding apparatus may be incorporated into the television, not in the set top box. Or, a car ex412 with an antenna ex411 can receive a signal from the satellite ex410, the base station ex107 or the like, so as to reproduce a moving picture on a display device such as a car navigation system ex413 mounted on the car ex412.

Furthermore, it is also possible to code a picture signal by the moving picture coding apparatus presented in the above embodiment and to record the resultant in a recording medium. Examples include a DVD recorder for recording a picture signal on a DVD disc ex421 and a recorder ex420 such as a disc recorder for recording a picture signal on a hard disk. Moreover, a picture signal can also be recorded in an SD card ex422. If the recorder ex420 is equipped with the moving picture decoding apparatus presented in the above embodiment, it is possible to reproduce a picture signal recorded on the DVD disc ex421 or in the SD card ex422, and display it on the monitor ex408.

As the configuration of the car navigation system ex413, the configuration without the camera unit ex203, the camera interface unit ex303 and the picture coding unit ex312, out of the configuration shown in FIG. 16, is conceivable. The same is applicable to the computer ex111, the television (receiver) ex401 and the like.

Concerning the terminals such as the cellular phone ex114, a transmitting/receiving terminal having both an encoder and a decoder, as well as a transmitting terminal only with an encoder, and a receiving terminal only with a decoder are possible as forms of implementation.

As stated above, it is possible to employ the moving picture coding method and the moving picture decoding method presented in the above embodiments into any one of the above-described devices and systems. Accordingly, it becomes possible to achieve the effect described in the aforementioned embodiments.

It should also be noted that the present invention is not limited to the above embodiments, and many variations or modifications thereof are possible without departing from the scope of the invention.

Note that each function block in the block diagrams shown in FIGS. 3 and 9 can be realized as an LSI that is a typical integrated circuit apparatus. Such LSI may be incorporated in one or plural chip form (e.g. function blocks other than a memory may be incorporated into a single chip). Here, LSI is taken as an example, but, it can be called "IC", "system LSI", "super LSI" and "ultra LSI" depending on the integration degree.

The method for incorporation into an integrated circuit is not limited to the LSI, and it may be realized with a private line or a general processor. After manufacturing of LSI, a Field Programmable Gate Array (FPGA) that is programmable or a reconfigurable processor that can reconfigure the connection and settings for the circuit cell in the LSI may be utilized.

Furthermore, along with the arrival of technique for incorporation into an integrated circuit that replaces the LSI owing to a progress in semiconductor technology or another technique that has derived from it, integration of the function blocks may be carried out using the newly-arrived technology. Bio-technology may be cited as one of the examples.

Among the function blocks, only a unit for storing data to be coded or decoded may be constructed separately without being incorporated in a chip form.

INDUSTRIAL APPLICABILITY

As described above, the moving picture coding method and the moving picture decoding method according to the present invention are useful as methods for coding pictures that make up a moving picture so as to generate a coded stream and for decoding the generated coded stream, in devices such as a cellular phone, a DVD device and a personal computer.

The invention claimed is:

1. A coding method for coding a picture included in a moving picture by using a quantization matrix, said coding method comprising:

generating a matrix ID identifying a quantization matrix different from a default quantization matrix;

coding the quantization matrix identified by the matrix ID, in association with the matrix ID;

coding a current picture using the quantization matrix to generate data of the coded current picture; and adding the matrix ID identifying the quantization matrix used in said coding of the current picture, to the data of the coded current picture, wherein the picture is made up of a luma component, a first chroma component and a second chroma component, and wherein said coding of the current picture, when neither of the quantization matrix for the first chroma component and the quantization matrix for the second chroma component is coded in said coding of the quantization matrix identified by the matrix ID, the first chroma component and the second chroma component of the current picture are coded using the quantization matrix for the luma component, instead of the default quantization matrix, as the quantization matrix for the first chroma component and the second chroma component of the current picture, wherein a processor is configured to execute the generating step, coding steps and adding step.

*2. A coding method for coding a picture included in a moving picture by using a quantization matrix, said coding method comprising:*

*generating a matrix identifier identifying a quantization matrix different from a default quantization matrix, the default quantization matrix differing for intra-picture coding and inter-picture coding;*

*coding the quantization matrix identified by the matrix identifier, in association with the matrix identifier;*

*coding a current picture using the quantization matrix to generate data of the coded current picture; and*

*adding the matrix identifier identifying the quantization matrix used in said coding of the current picture, to the data of the coded current picture,*

*wherein the picture is made up of a luma component, a first chroma component and a second chroma component, and*

*wherein in said coding of the current picture,*

*when neither of a first quantization matrix for the first chroma component and a second quantization matrix for the second chroma component is coded in said coding of the quantization matrix identified by the matrix identifier, but a third quantization matrix for the luma component is available, the first chroma component and the second chroma component of the current picture are coded using the third quantization matrix for the luma component, instead of the default quantization matrix that differs for intra-picture coding and inter-picture coding, as the quantization matrix for the first chroma component and the second chroma component of the current picture,*

*wherein a processor is configured to execute the generating step, coding steps and adding step.*

* * * * *